United States Patent [19]

Greer

[11] 3,980,939

[45] Sept. 14, 1976

[54] PROCESS CONTROL SYSTEM USING A TWO WIRE REMOTE CONTROL SYSTEM

[75] Inventor: Homer L. Greer, Bryn Athyn, Pa.

[73] Assignee: Honeywell Inc., Minneapolis, Minn.

[22] Filed: May 13, 1974

[21] Appl. No.: 469,345

[52] U.S. Cl. .............................. 318/599; 318/624; 318/610
[51] Int. Cl.² ...................................... G05B 11/28
[58] Field of Search .......... 318/578, 674, 673, 640, 318/624, 609, 610, 599; 323/21

[56] References Cited
UNITED STATES PATENTS

| | | | |
|---|---|---|---|
| 3,252,067 | 5/1966 | Derenbeeher, Jr. | 318/678 X |
| 3,483,455 | 12/1969 | Klysa et al. | 318/599 X |
| 3,549,976 | 12/1970 | DeBretagne | 318/610 X |
| 3,571,688 | 3/1971 | Tomasulo et al. | 318/674 X |
| 3,639,824 | 2/1972 | Malavasi | 318/678 X |
| 3,671,849 | 6/1972 | Kingston | 323/21 X |
| 3,686,557 | 8/1972 | Futamura | 318/672 X |
| 3,751,940 | 8/1973 | Norbeck | 318/599 X |
| 3,780,318 | 12/1973 | Werts et al. | 323/21 X |

OTHER PUBLICATIONS

Applications of the uA742 Trigac, A Zero Crossing AC Trigger, 1969 Fairchild Semiconductor.

Primary Examiner—Robert K. Schaefer
Assistant Examiner—John J. Feldhaus
Attorney, Agent, or Firm—Laurence J. Marhoefer; Lockwood D. Burton

[57] ABSTRACT

A process control system including a control station responds to the departure of a process variable from a set point to provide a direct current signal in a two-wire transmission line in a direction dependent upon the direction of such departure and time-proportioned in accordance with the magnitude of the departure. A solid state power relay that accepts the d-c signal at a single pair of input terminals includes high-current rating triacs that are adapted selectively to be fired by triggering pulses generated in response to the d-c signals to supply alternating current power from a source of single-phase or three-phase alternating current to a heavy-duty motorized valve for operation of the latter in one direction or the other and at a speed in accordance with the signals. The power relay is characterized in its provisions for synchronizing the triggering pulses to the triacs with the time of zero voltage across the triac, precluding such firing of a triac when the voltage across an associated triac is less than a predetermined value, delaying for a predetermined time such firing upon a command for reversal in the direction of operation of said motorized valve, locking-out to prevent further firing of the triacs upon rapid reversal of input commands, and monitoring of the triacs to provide an alarm and/or to effect deenergization of the power relay and motorized valve when the triacs fail to fire in accordance with the command.

13 Claims, 21 Drawing Figures

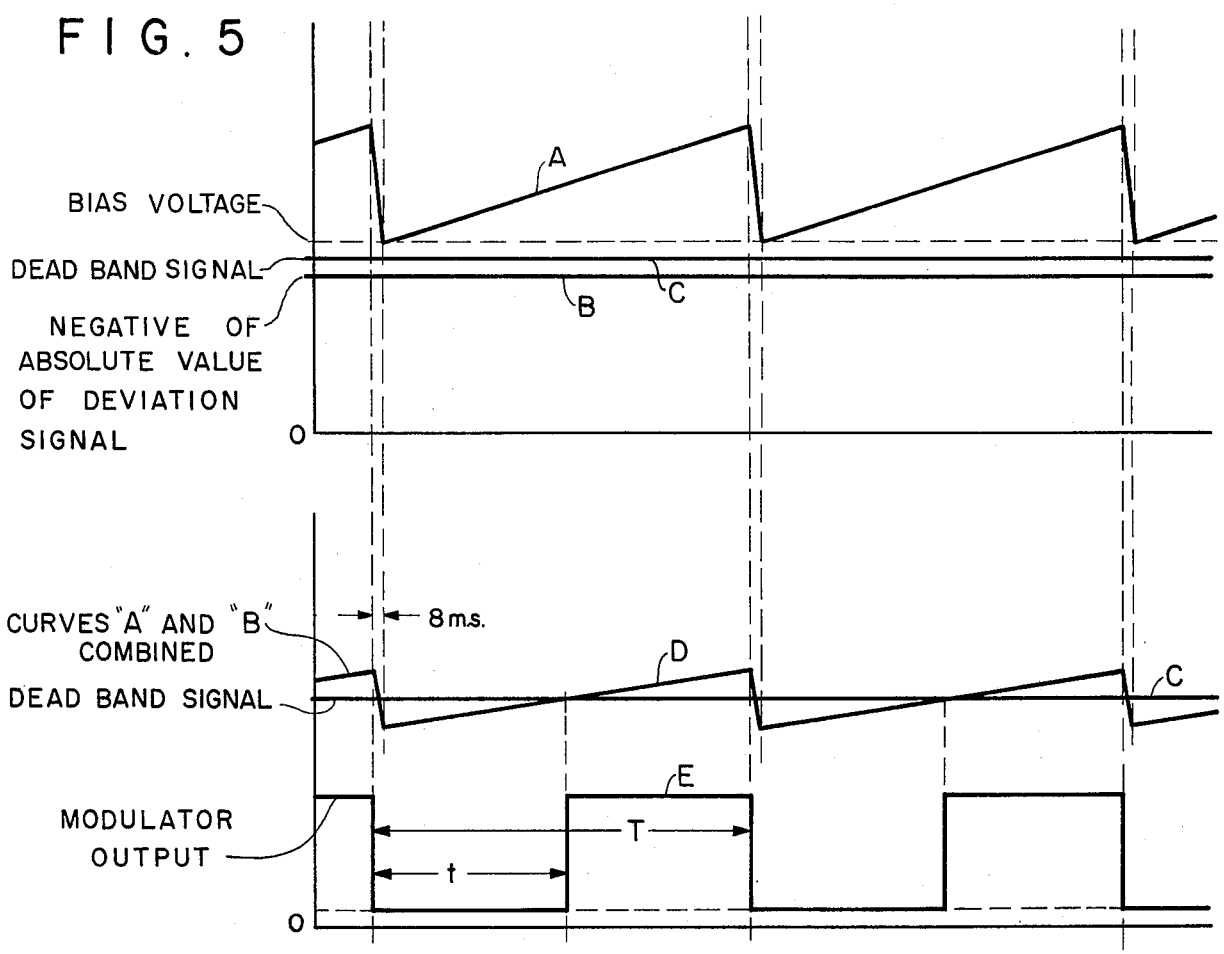
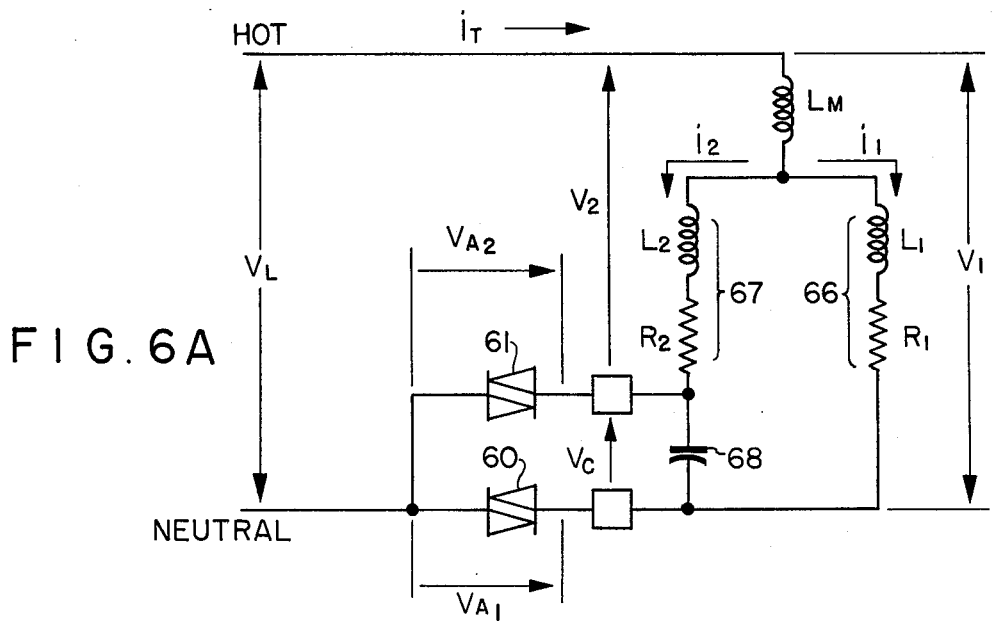

SINGLE PHASE REVERSING

THREE PHASE REVERSING

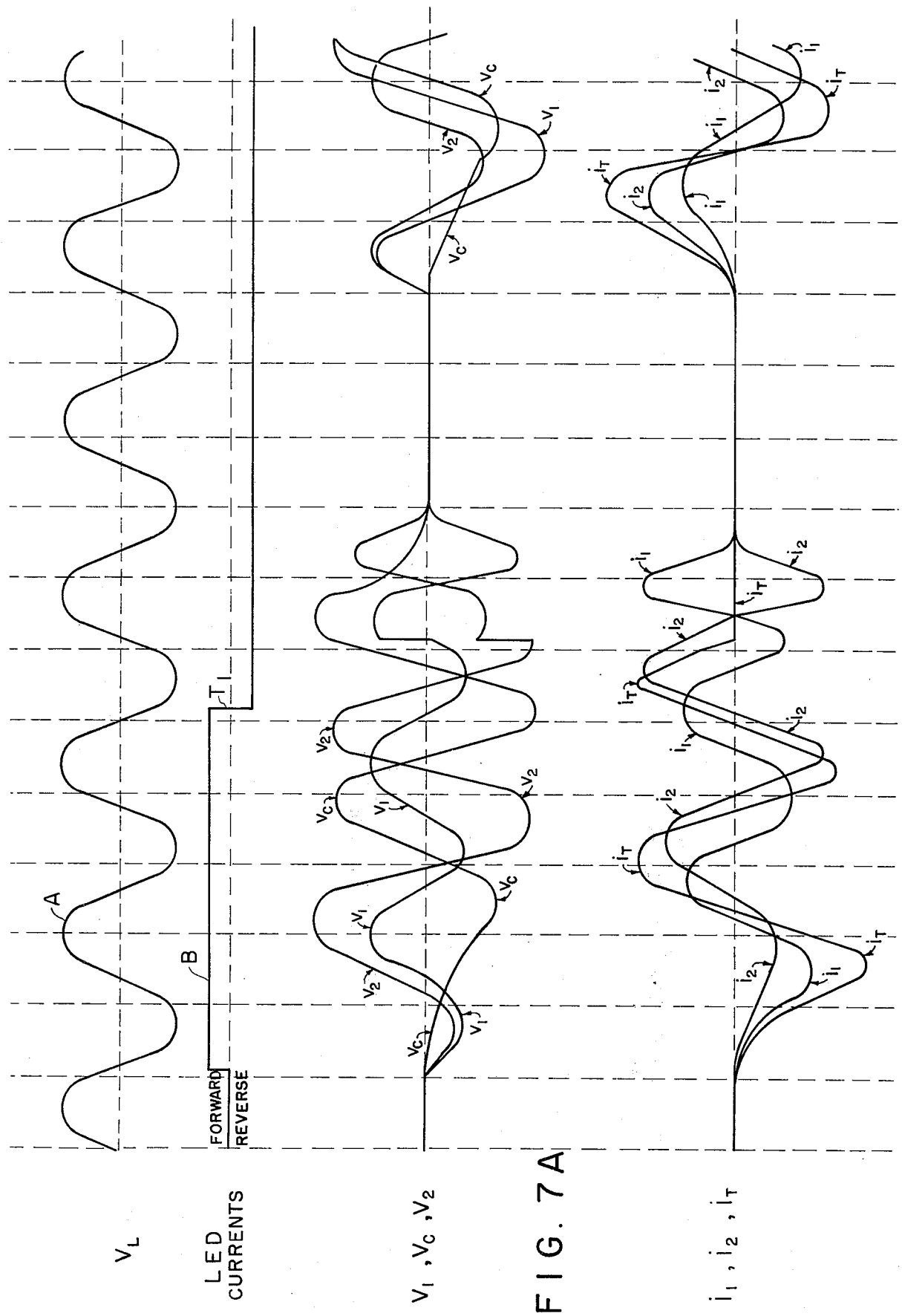

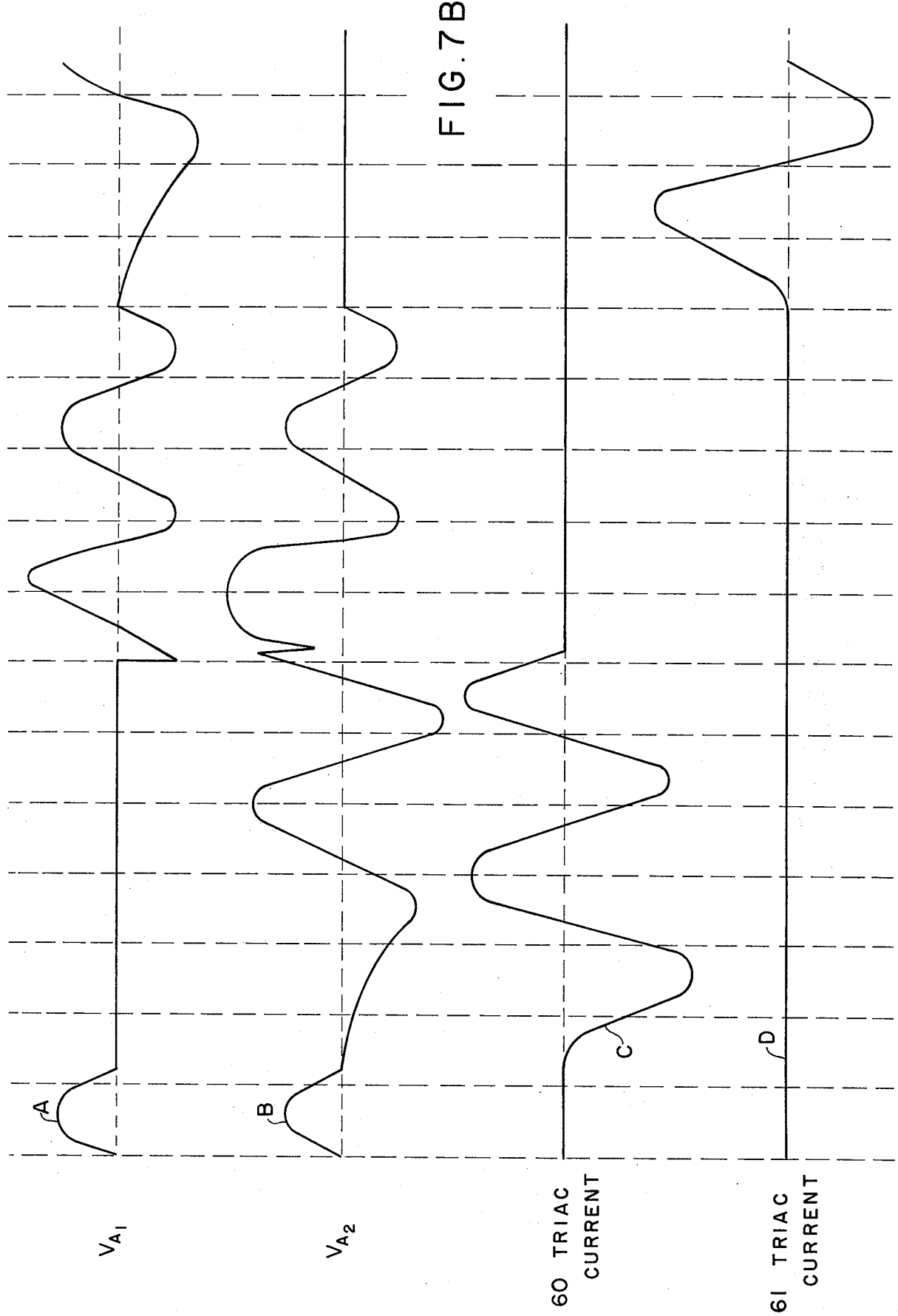

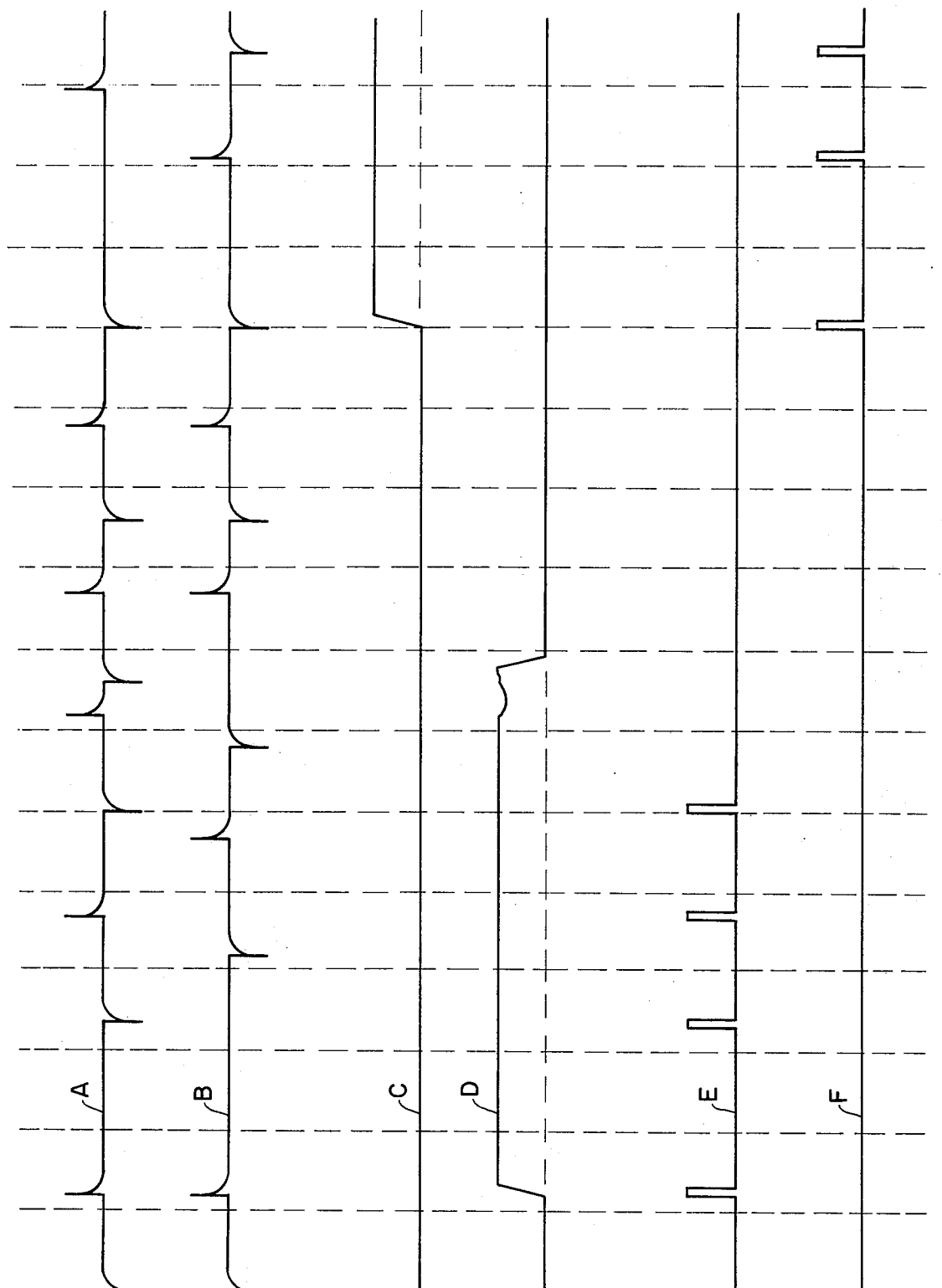

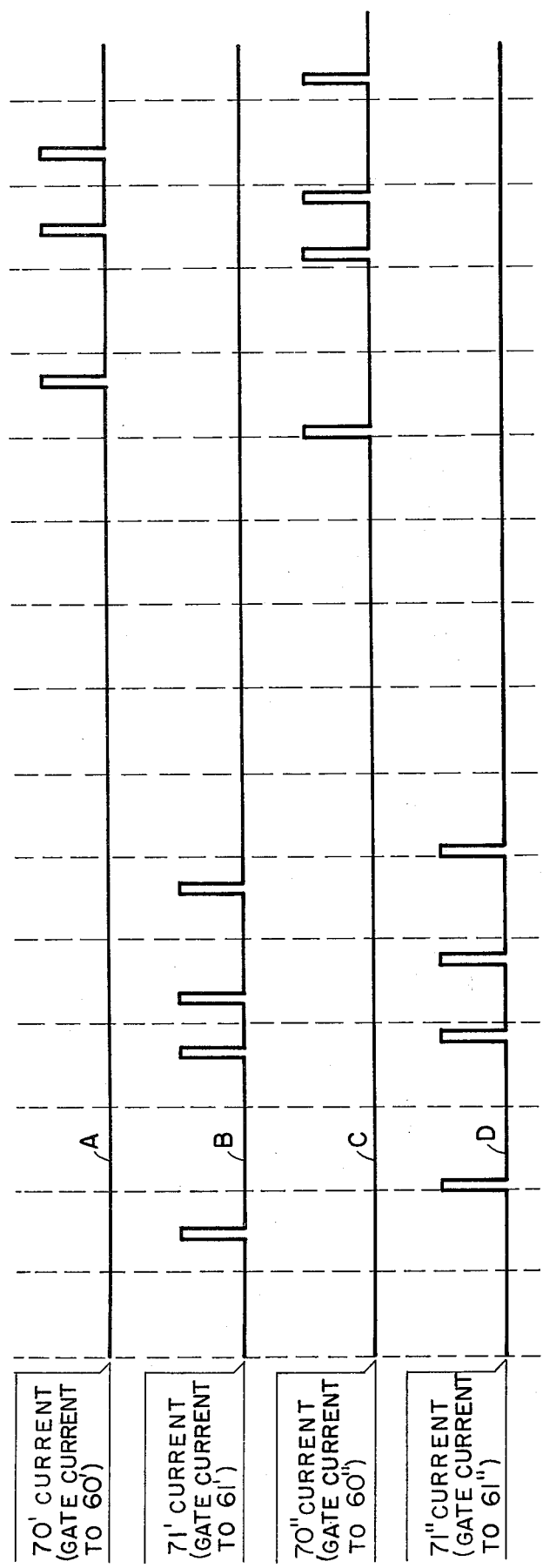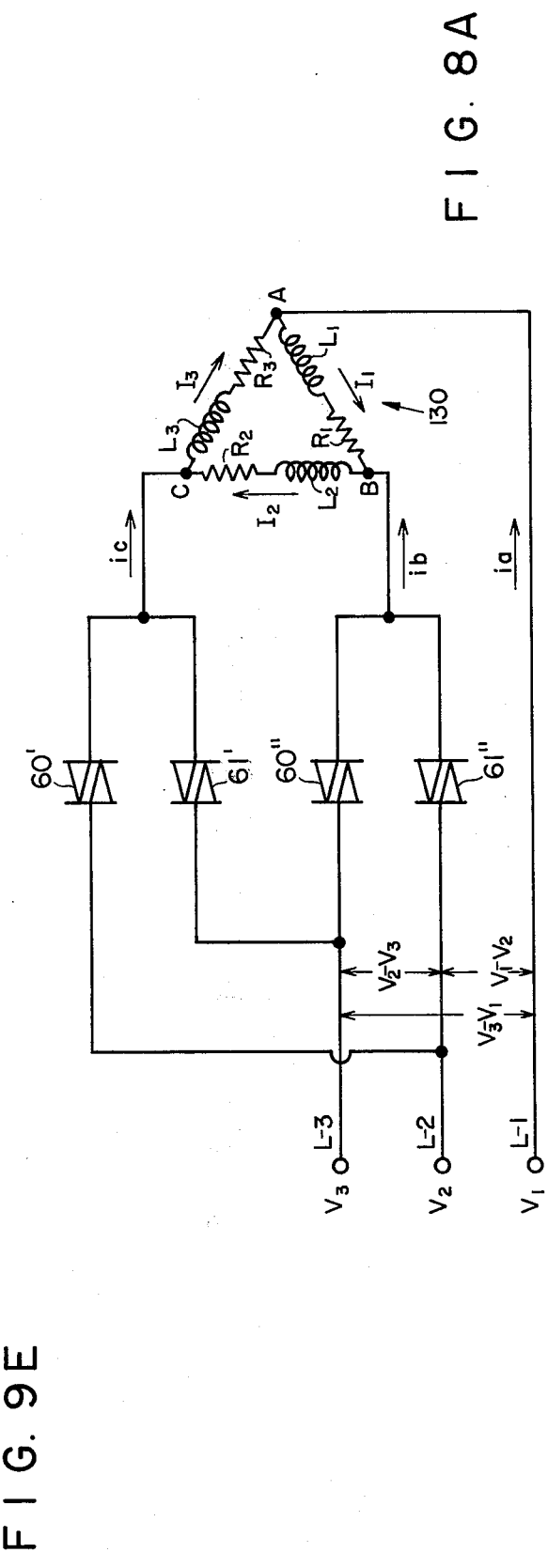

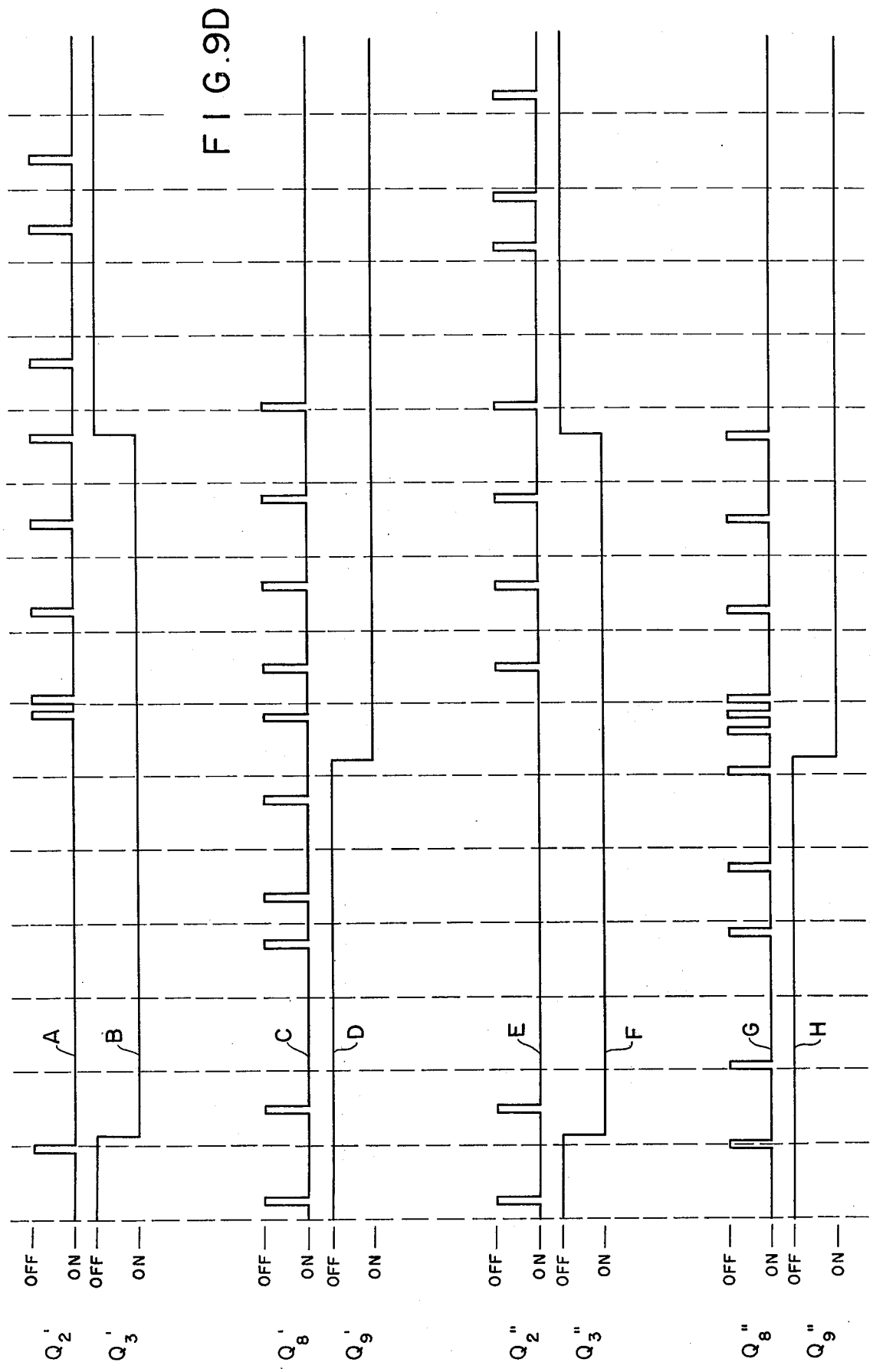

3,980,939

PROCESS CONTROL SYSTEM USING A TWO WIRE REMOTE CONTROL SYSTEM

BACKGROUND OF THE INVENTION

1. Field of the Invention

This invention relates generally to solid state controllers having utility in industrial processes and adapted to respond to a process signal for operating a motorized valve. The invention is concerned with that type of controller that is adapted to provide so-called proportional speed floating control. The controller according to the present invention is particularly concerned with a solid state electronic power relay that is operative in response to a d-c time-proportioned signal transmitted over a low voltage and low current two-wire transmission line to regulate the speed and direction of an electric motor valve actuator and thereby a final control element to restore and maintain an industrial process at a desired value. The controller is particularly suitable for flow rate, pressure, viscosity, liquid level, and other industrial processes having short time constants.

2. Description of the Prior Art

Proportional speed floating control is a type of control action in which the direction and rate of adjustment of the final control element, such as a valve, damper, etc., is proportional to the direction and extent of deviation, from a desired set point, of the process variable that is being controlled. The final control element is said to float since the position of adjustment thereof can be anywhere within the operating range when the deviation is zero.

Proportional speed floating controllers accept voltage or current input signals from primary sensors responsive to process variables to provide, for example, rate of flow control, by means of motor driven valves, of water, sewage, sludge, slurry, and other process fluids. Such controllers compare the signal from the flow or other process variable transmitter with a set point signal representing a desired flow rate. Such set point signal may be either locally or remotely generated. When a difference appears between the actual and the desired process variable value, the controller provides output signals that regulate the supply of energizing current to a reversible electrical motor for rotation at a speed and in a direction to operate a control valve as required to restore the process variable to the desired value. The basic control mode is proportional velocity. That is to say, the output signals of the controller are speed signals that are proportional to deviation and that are integrated by the electrical motor as the latter drives to the correct valve position.

Controllers of this type may be employed to directly control the operation of a light-duty motorized valve having, for example, a rating of one ampere or less. In modern industrial process control systems, however, heavy-duty motorized valves having much higher power requirements are used. When such controllers are employed to operate such heavy-duty motorized valves, a power relay must be employed to control the required heavy current and or high voltage to the motorized valve. Such power relays in some applications are located adjacent the motorized valve with the controller output signals being transmitted to the power relay over a three-wire, relatively high voltage, transmission line. When so located energizing current is supplied to the power relay from a locally available source.

Solid state power relays utilizing semi-conductor switches of the type normally referred to as an SCR, triac or thyristor have been proposed in the prior art because of their heavy current and high voltage handling capabilities. The prior art power relays, however, have had certain practical drawbacks that have affected their reliability and suitability for certain applications, which drawbacks have been evident, particularly, in connection with the use of such power relays in energizing heavy-duty single-phase and three-phase alternating current reversible electrical motors. The high rate of current change with time at the moment of firing such semiconductor switches has been of utmost significance in connection with the reliable opration of such power relays, both due to the failure of the semiconductor switches themselves and also the circuitry to which the switches are connected.

SUMMARY OF THE INVENTION

An object of the present invention is to provide, for use with a proportional speed floating controller, an improved heavy-duty, high-reliability, solid state power relay having particular utility in controlling the energization of heavy-duty single-phase and three-phase alternating current electrical motors.

A further object of the invention is to provide an improved power relay for a proportional speed floating controller that is particularly suitable to control the direction and speed of a reversible electrical motor in response to d-c signals in a two-wire low voltage and low current transmission line that connects the power relay to a distant controller.

Another object of the invention is to provide such a power relay embodying a plurality of semiconductor switches, for example, triacs, and including an improved zero-crossing detector circuit arrangement to synchronize the triggering pulses to the gates of the semiconductor switches and thereby to eliminate or minimize electromagnetic and radio frequency disturbances. This is of particular importance in those applications where the power factor of the load is variable since in the case of capacitive or resistive components in the load the rate of current change is limited by the improved detector circuit arrangement.

Another object of the invention is to provide such an improved power relay wherein the firing of a first triac in response to a command for a control action in one direction is precluded unless a voltage of a predetermined magnitude exists across a second triac which when fired produces a control action in the opposite direction.

A more specific object of the invention is to provide in a power relay embodying a plurality of semi-conductor switches, such as triacs, means to delay the triggering pulses to the gate circuits of the semiconductor switches on a command from the controller for reversal of the motor, thereby to prevent rapid reversal of the direction of motor energization. In the case of a single-phase motor, this avoids continued running of the motor in the same direction although commanded to reverse, and in a three-phase system, allows time for all phases to be deenergized before phases are switched.

A further specific object of the invention is to provide such a power relay including means to lock-out upon rapid reversal of input commands thereby to avoid firing of two semiconductor switches simultaneously, which firing would result in shorting, line-to-line, of the alternating current power source, which lock-out means, however, do not prevent rapid turn-on and turn-off of the semiconductor switches to supply energizing current to the motor for continued operation in the same direction.

Another specific object of the invention is to provide means to detect when the semiconductor switches have not switched in accordance with input commands and to provide suitable alarms in such event and/or to actuate a suitable relay to deenergize the power relay and motor circuits.

In accomplishing these and other objects there has been provided in accordance with the present invention an improved solid state power relay of high reliability which accepts commands in d-c time-proportioned form at a single pair of input terminals and which embodies high-current rating semi-conductor switches that are adapted to be fired in response to said commands selectively to energize a heavy-duty motorized valve for adjustment in one direction or the other. A zero-crossing detector is provided to synchronize the triggering pulses to the semiconductor switches with the time of zero voltage across the latter whereby to minimize electromagnetic and radio-frequency interference. The use of the zero-crossing detector as contemplated by this invention is of particular importance in those applications, for example, single-phase and three-phase reversible electrical motors, where the power factor of the load is variable, where rapid on-off pulsing causes varying initial conditions or where transients still exist from previous on cycle at the time of the next on cycle. Means are also provided in accordance with the present invention to delay the triggering of the semiconductor switches, on a command for reversal in the operation of the load, for example, the reversal of an electrical motor, thereby to prevent rapid reversal of the direction of load energization. Means are also provided to lock-out on rapid reversal of input commands to avoid firing of the semiconductor switches in such a manner that line-to-line shorting of the alternating current power source will result. The lock-out means provided, however, is such as to permit rapid turn-on and turn-off of the semicondutor switches to supply energizing current to the load for continued operation in the same direction. Means are also provided to detect when the semiconductor switches have not switched in accordance with commands and to actuate suitable alarms in such event, and/or to actuate a suitable relay to deenergize the power relay and load circuits.

BRIEF DESCRIPTION OF THE DRAWINGS

A better understanding of the present invention may be had from the following detailed description when read in connection with the accompanying drawings wherein:

FIG. 5 illustrates the voltage wave forms generated by the modulator of FIG. 4;

FIG. 6A is a schematic representation of a portion of FIG. 6 showing equivalent circuit components;

FIGS. 7A, 7B, 7C and 7D are wave form diagrams illustrating the operation of the power relay;

FIG. 8A is a schematic representation of a portion of the apparatus of FIG. 8 showing equivalent circuit components;

FIGS. 9A, 9B, 9C, 9D and 9E are wave form diagrams illustrating the operation of the power relay of FIG. 8;

DETAILED DESCRIPTION OF THE EMBODIMENTS

Figure 1:
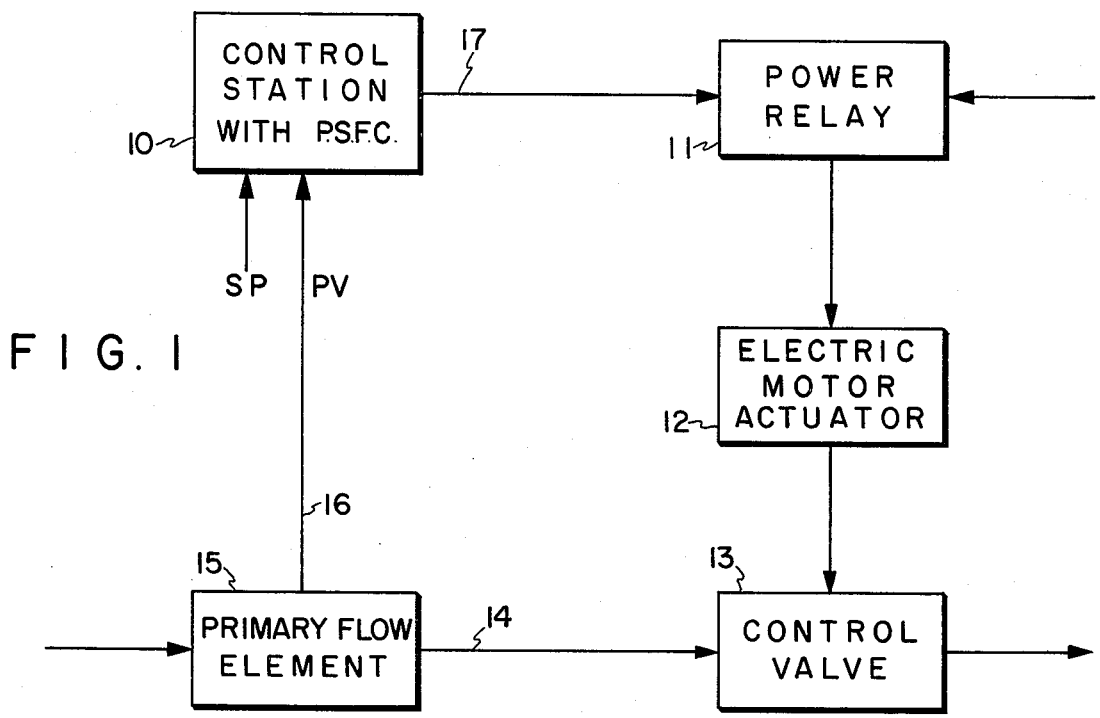
FIG. 1 of the drawing is a simplified block diagram of a process control system, specifically, a rate of flow control loop, embodying the present invention.

In FIG. 1 there is illustrated in simplified block form a proportional speed floating electronic process controller. The controller includes a deviation indicating control station generally designated by numeral 10 and a solid state power relay designated by the numeral 11. Analog signal values representing process variable (PV) and desired set point (SP) are applied to station 10. A heavy-duty reversible electrical motor 12 is arranged to be energized by the power relay 11 to drive a final control element or valve 13 which regulates a process, shown as the flow of fluid through a controlled flow line 14.

The process variable signal to the control station 10 is derived by means of a transducer 15. Transducer 15 is connected to control station 10 by a transmission line 16. The set point signal (SP) may be manually determined as by manipulation of an adjustable slide wire, not shown in FIG. 1.

Typically the process controlled may comprise a flow of water, sewage, sludge, slurry or other liquid through line 14. Transducer 15 may comprise a flow transmitter which senses the rate of flow of such liquid and develops the analog process variable signal PV that is applied to the control station 10. While not shown, the control station conveniently may be provided with indicators to display the value of the process variable, the set point value, and the valve opening as effected by the operation of the reversible electrical motor 12. If such display of valve opening is desired, there may be provided in known manner other circuitry, not shown, including, for example, an external adjustable slide wire that is operated in accordance with the valve position.

The control station 10 senses the departure or deviation of the process variable PV from the set point SP and produces a nominal 10 ma d-c time-proportioned signal of one polarity, in a low voltage and current two-wire transmission line indicated generally at 17, upon departure of the process variable PV in one direction, and produces a 10 ma d-c time-proportioned signal of the opposite polarity in line 17 when the departure of the process variable PV is in the opposite direction.

The d-c time proportional current signal appearing at the output of control station 10 is transmitted by the transmission line 17 to power relay 11, wherein it is sensed by one or the other of a pair of photo-isolators, depending upon its polarity, as is explained hereinafter with reference to FIGS. 6 and 7. Upon the appearance of a signal at the input of power relay 11, the reversible motor 12 is energized for rotation in one direction or the other depending upon the polarity of said signal. The speed at which the reversible motor rotates is in accordance with the time-proportioning of the said signal. The rotation of the motor and consequent adjustment of valve 13 restores the process 14 to the condition at which the process variable and set point signals are in accord.

The basic control mode, as noted hereinbefore, is proportional velocity. Thus the output of the power relay 11 in addition to being a direction signal, is a speed signal that is proportional to the deviation of PV from SP, which signal is integrated by the electrical motor 12 as the latter drives to the correct valve position. The time-proportioned signals from control station 10 determine motor speed by duty cycle while their polarity determine the direction of motor rotation.

Figure 2:
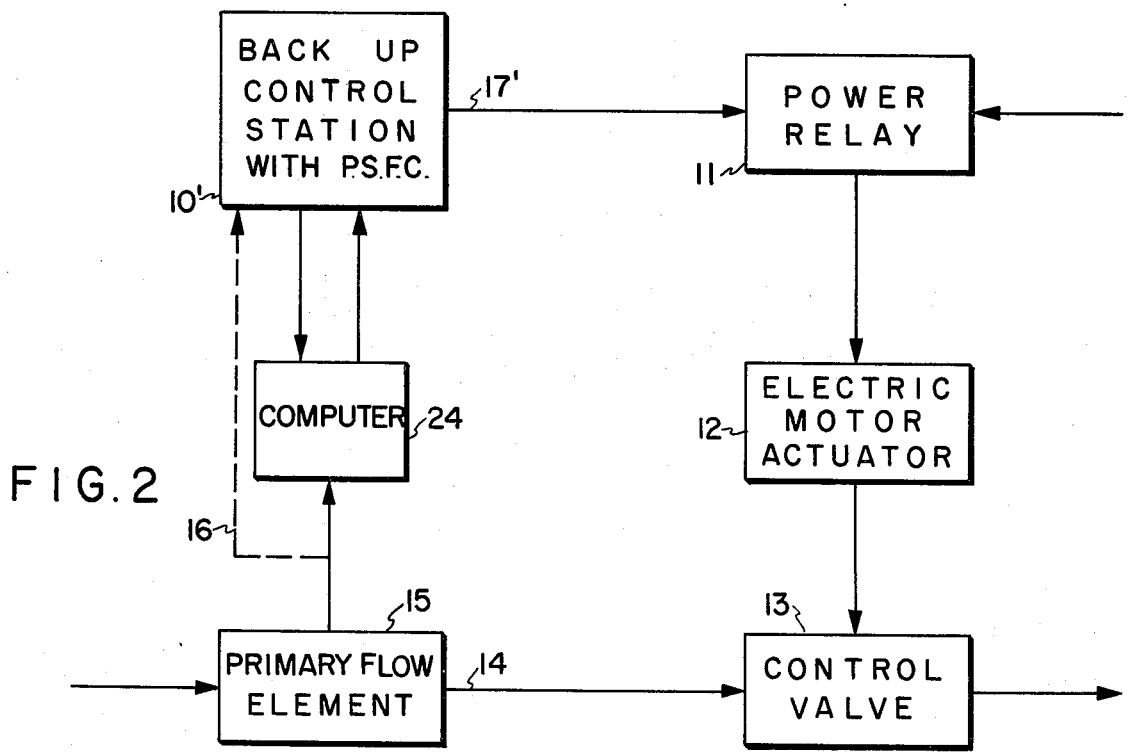
FIG. 2 is a simplified block diagram showing a rate of flow control loop according to the present invention and arranged in conjunction with a direct digital control (DDC) computer installation.
Figure 3:
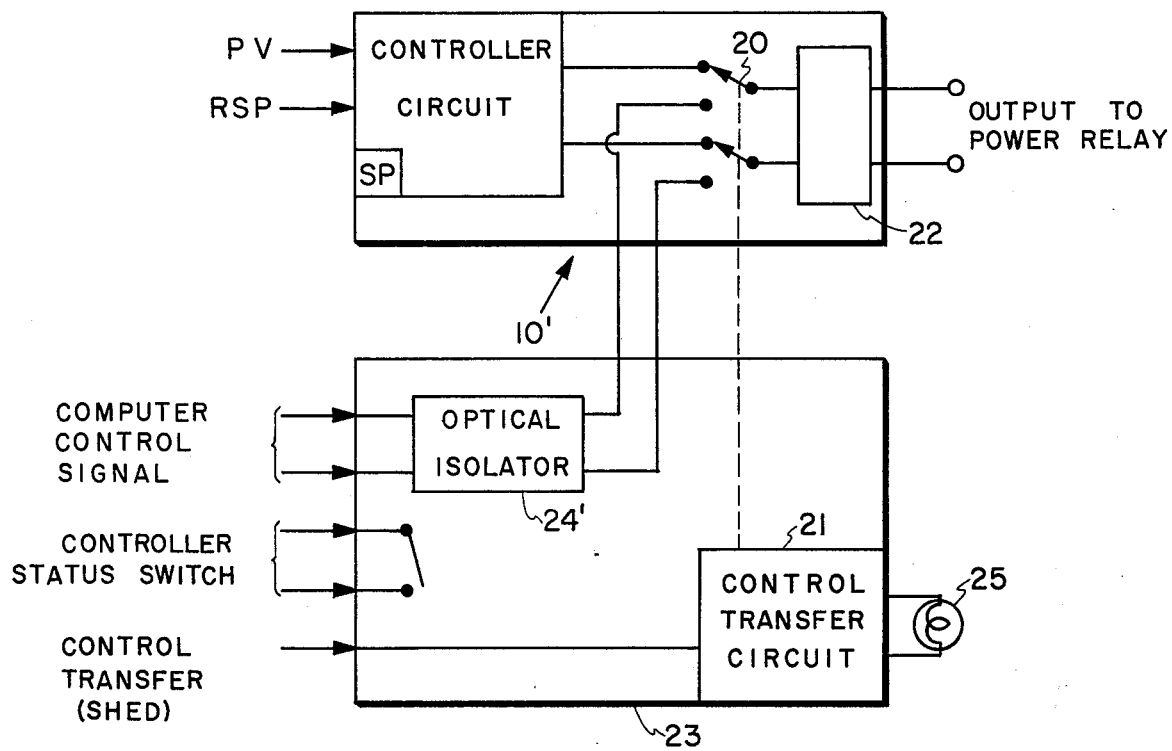
FIG. 3 is a block diagram illustrating the computer-backup control interface of the system shown in FIG. 2.

FIGS. 2 and 3 illustrate the basic control station of FIG. 1 modified to allow it to be employed as a backup controller in a DDC computer installation. The control station in FIGS. 2 and 3 is designated by numeral 10'. In one mode of operation of the arrangement of FIG. 2, the controller mode, the flow rate in controlled flow line 14 is controlled by comparing the flow signal PV from the transducer 15 to set point SP and proportioning the speed and direction of reversible motor 12 through the power relay 11. The arrangement of FIG. 2, however, also provides for operation in a computer mode wherein a computer 24 directly provides time-proportioned signals to an output section of the control station 10'.

Thus, by reference to FIG. 3 it is seen that when a transfer switch 20 is adjusted to computer position by a control transfer circuit 21, an output drive circuit 22 of the control station 10' is provided with bi-directional d-c current input signals directly from the computer 24 by way of a computer adapter card 23 having an optical isolator 24', to provide signals representing, for example, rate of flow of water, sewage, sludge, slurry and other process fluid flows. With switch 20 in computer position, the computer directly controls the ouput of station 10' and thereby motor 12 and valve 13. With the switch 20 in controller position, however, the control station 10' controls the output and the motor 12 and valve 13. A controller status light, designated 25, is provided to indicate whether the ouput is under control of the computer or controller 10'. For example, light 25 may be illuminated when the output is not under computer control.

Figure 4:
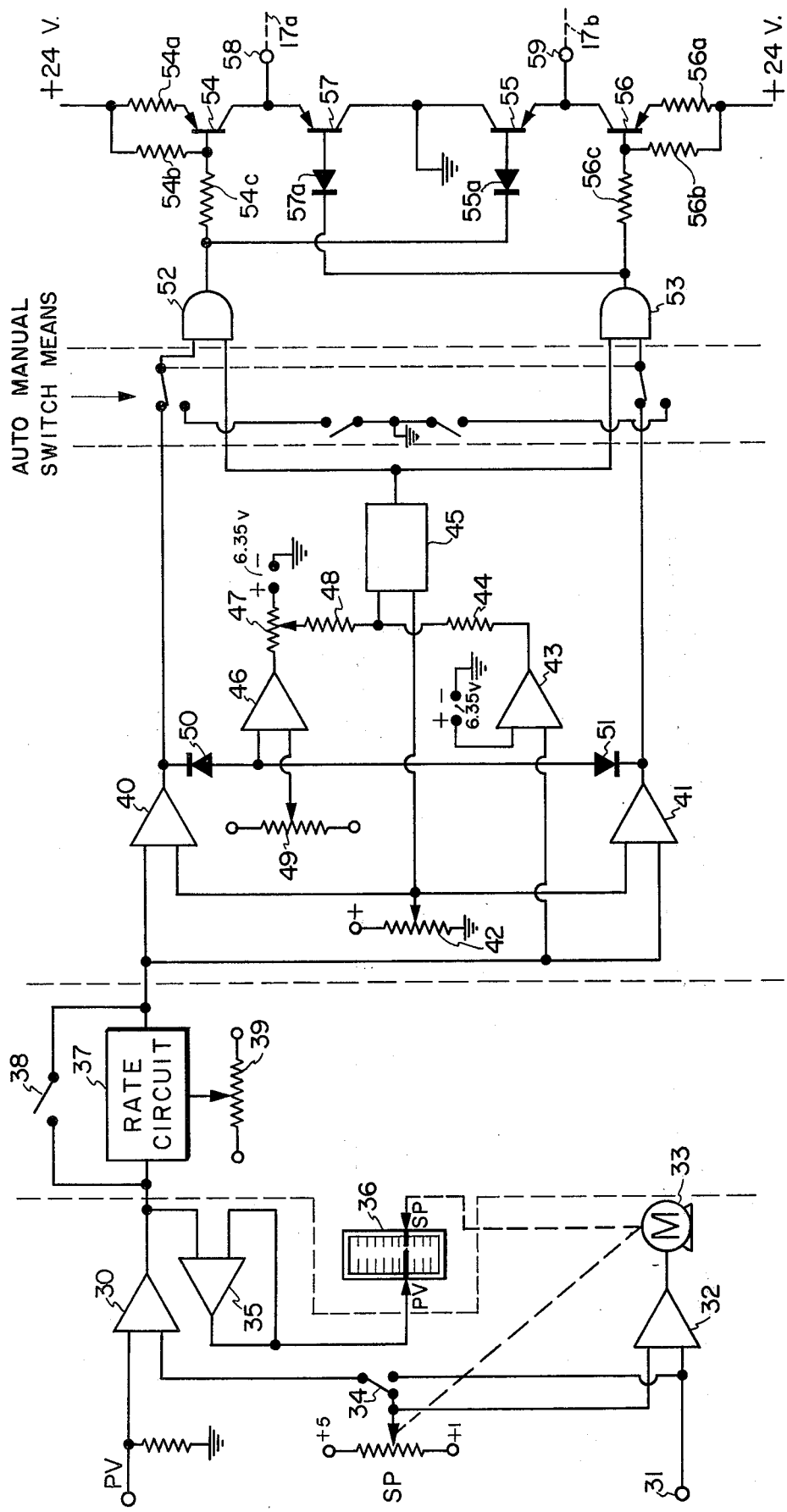
FIG. 4 is a schematic diagram of the basic control station of the system illustrated in FIGS. 1 and 2.

In FIG. 4, which schematically illustrates the circuitry of the basic control station 10 of FIG. 1, the PV and SP signals are shown applied to the input terminals of a deviation amplifier 30. The SP signal is obtained from the adjustment of a contact along a slide wire. That adjustment may be manual, or, as shown, in FIG. 4, may be effected automatically in response to a signal transmitted to terminal 31 from a remote point. To that end, a servo motor amplifier 32 and reversible motor 33 are provided to effect the automatic adjustment of the set point slide wire in response to the remote set point adjustment. A single pole double throw switch 34 also is provided whereby in one position, the signal from the set point slide wire is applied to the input of amplifier 30, and in the other position, the remote set point signal is applied directly to the input of the amplifier 30. With the latter connection, the servo amplifier 32 and motor 33 are not deenergized but continue to operate to adjust the slide wire, thereby tracking the remote set point adjustment.

Amplifier 35 and a meter shown at 36 are provided to indicate the deviation of the process variable signal from the desired set point. The meter 36 is isolated from the output of the deviation amplifier 30 by the amplifier 35. The latter also scales the deviation amplifier output. Optional alarm loads not shown may be associated with the meter 36.

The output of deviation amplifier 30 is also connected to the input of a rate circuit shown at 37. The rate circuit, which can be bypassed by a switch 38, provides, for example, a rate time adjustment from 0.4 to 60 seconds. This time depends upon the setting of a rate time adjustment slide wire 39. Typically, this rate circuit can influence the output deviation or error signal from the amplifier 30 for as long as two minutes after the zero deviation conditions are reached. The signal at the output of the rate circuit 37 comprises the deviation signal with a derivative component added. That output signal is applied in an inverse manner to each of the input circuits of a pair of polarity detectors indicated at 40 and 41. A signal derived from the tap on an adjustable slide wire indicated at 42 is also applied to a common terminal of the input circuits of polarity detectors 40 and 41. The latter signal provides a neutral zone in which some limited deviation between the process variable and set point signals can occur before a command is given to the power relay for a control action.

The output signal voltage of the rate circuit, as shown in FIG. 4, is applied also to an amplifier 43. The amplifier 43 is an absolute value amplifier having a one-to-one gain and transmits both positive and negative signal voltages at its input as a negative voltage at its output. The output of amplifier 43 is connected by a resistor 44 to a first input terminal of a modulator 45, to which input terminal a saw tooth voltage is also arranged to be applied by a saw tooth generator 46 through a circuit including a gain adjustment resistor 47 and a fixed resistor 48. The neutral zone signal voltage from slide-wire 42 is connected to the other input terminal of the modulator 45. One input terminal of the saw tooth generator 46 is connected to the tap on an adjustable slide wire 49 and the other input terminal is connected to the junction of a pair of back-to-back connected diodes 50 and 51. The other terminals of the diodes 50 and 51 are connected, respectively, to the output terminals of the polarity detectors 40 and 41.

With this arrangement, when the output signal voltage from the rate circuit 37 is less than a predetermined value, for example, 2 volts, the output voltage of each of the polarity detectors 40 and 41 is at a high level, for example 24 volts. Because of their inverse connection to the output of the rate circuit 37, however, the polarity detectors 40 and 41 respond selectively to an increase in the rate circuit output signal depending upon the direction or polarity of that output signal. Thus, upon a deviation greater than 2 volts in one direction at the output of rate circuit 37, the output voltage of the polarity detector 40 drops to a low level. Conversely, upon such a deviation greater than 2 volts in the opposite direction the output of polarity detector 41 drops to a low level. The output circuits of polarity detectors 40 and 41 are connected respectively to the input of an individually associated AND gate 52 and 53. Gates 52 and 53 are of the type that conduct only when the signal voltages are applied to both inputs at a low level.

The deviation or error signal, as noted, also passes through amplifier 43 to the input of modulator 45. The modulator 45 compares the deviation signal amplitude with the output signal voltage of the saw tooth oscillator 46. The amplitude of the signal at the output of the latter is determined by the adjustment of the slide wire 47. The slide wire 47 is a so-called gain or speed factor control.

It is noted that the sawtooth wave output of the sawtooth generator 46, as it appears at the slider 47, rides on a bias voltage which in a typical embodiment of the invention may be 6.35 volts above ground. A similar bias voltage is provided between the upper input terminal of the absolute value amplifier 43 and ground whereby the signal voltage at the output of amplifier 43 lies between the value of the bias voltage and ground and approaches the latter as the deviation signal on its input increases from zero in either direction. The voltage across the slidewire resistor 42 desirably also has a similar value.

By reference to FIG. 5 it will be seen that the modulator 45 generates an output signal voltage or pulse that is time-proportioned to the deviation signal magnitude and gain control setting. The input signal to the upper terminal of the modulator 45 comprises the algebraic sum of two signals represented respectively by curves A and B. The curve A is a sawtooth wave of a signal taken from the tap on slidewire 47. The curve B represents the signal appearing at the output of the absolute value amplifier 43. The input to the lower terminal of modulator 45 is represented in FIG. 5 by the curve C. This is the dead band signal derived from the slidewire 42. The curve D in FIG. 5 is a representation of the algebraic sum of the curves A and B and is shown being compared with the dead band signal represented by the curve C.

With these input signals applied to the modulator 45, the latter produces an output signal that is represented by the curve E in FIG. 5. Curve E, as shown, is a square wave, and has a low value whenever the curve D has a negative slope or is below the value represented by the dead band curve C. Conversely, the curve E has a high value whenever the curve D is above the value represented by the curve C and has a positive slope.

Upon variation in the magnitude of the deviation signal, there is a corresponding change in the proportion of the time that the curve E has a low value compared to the time that it has a high value. The ratio of the time that the curve E has a low value to the total time of each cycle is referred to as the duty cycle. Thus, the duty cycle is variable in accordance with the magnitude of the deviation signal from the circuit 37. It will be apparent that the minimum time in which the curve E has a low value is the time required for the sawtooth voltage of curve A to drop from its maximum to its minimum value. This also is the minimum duty cycle achievable with the apparatus of FIG. 4. In a typical embodiment of the invention, this minimum time may well be eight milliseconds (ms).

The frequency of the sawtooth wave A, and thereby of the square wave E, is determined by the setting of the cycle time adjustment slide wire 49 and may be varied over a range of 20 cycles per second to 0.002 cycles per second. Thus, the range of variation of the period of each cycle is from 0.05 seconds to 50 seconds.

The output signals from the polarity detectors 40 and 41 and from the modulator 45 drive the gates 52 and 53. Depending upon the polarity of the deviation signal voltage at the output of rate circuit 37, one or the other of the polarity detectors 40 and 41, because of their reverse input connections, will apply a low voltage to one input terminal of its associated gate 52 or 53. That low voltage will continue as long as the deviation is in the same direction and is greater than the predetermined value of the dead band setting. The time-proportional signal then appearing at the output of the modulator 45 is applied to the other input terminal of both gates 52 and 53 but will be effective in its low state only to open that one of the gates that then also has a low voltage applied to its said one input terminal. The time that the gate is so held in an open state is in accord with the time modulations or proportioning action of the modulator.

The outputs of AND Gates 52 and 53 are connected respectively to control transistor pairs 54, 55, and 56, 57 whereby upon the opening of gate 52, transistors 54 and 55 are rendered conductive and a current pulse is transmitted through a circuit including transistor 54, terminal 58 and wire 17a to the remotely located power relay 11. The circuit continues through one of a pair of reversely connected optical isolators at the power relay, as seen in FIG. 7, and back over wire 17b to terminal 59 and through transistor 55 to ground. When the deviation is in the opposite direction, a current pulse is transmitted through a circuit including transistor 56 to terminal 59, wire 17b to the power relay including the other of said pair of optical isolators and back over wire 17a to terminal 58 and through transistor 57 to ground. The duty cycle of the current pulse in each case is determined by the output signal of modulator 45. The current pulse in each case, also, may have a nominal value of 10 milliamperes, as hereinbefore noted.

To this end, a 24 volt direct current source is provided, as shown, in FIG. 4, for energizing the collector-emitter circuits of the transistors 54, 55, 56 and 57. Specifically, the positive terminal of the source is connected by resistors 54a and 56a to respectively associated emitters of transistors 54 and 56. The said terminal is also connected by resistors 54b and 56b to respectively associated bases of the transistors 54 and 56. The collectors of the transistors 54 and 56 are connected respectively to the emitters of the transistor 57 and 55, the collectors of which are directly connected to ground. The output of the gate 52 is connected by a resistor 54c to the base of the transistor 54, and is connected through diode 55a to to the base of the transistor 55. Similarly, the output of the gate 53 is connected by a resistor 56 to the base of the transistor 56, and is connected through a diode 57a to the base of the transistor 57. The terminals 58 and 59 are connected respectively to the collectors of the transistors 54 and 56.

If desired, the production of the bidirectional current pulses in the transmission line 17a, 17b may be provided under manual control. To this end, the circuit of FIG. 4 includes AUTO-MANUAL SWITCH MEANS which in the normal position shown allows the automatic pulse generation as above described. When it is desired to control the production of such pulses manually, the double pole-double throw switch is moved from the position shown to its lower position. This disconnects the gates 52 and 53 from the polarity detectors 40 and 41 and connects these gates instead to respective normally open manually control switches which have their movable contact elements connected to ground. The manual closure of either of these switches then is effective to cause repeated current pulses of a corresponding direction to be produced in the transmission line 17a, 17b due to the pulses produced at the output of the modulator 45.

Figure 6:
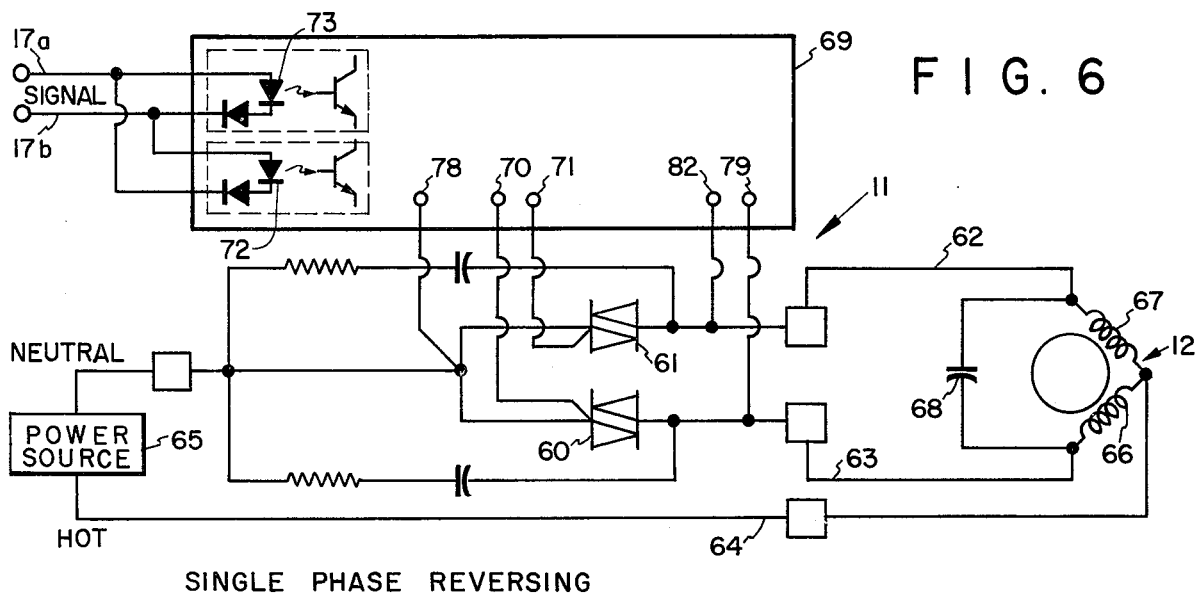
FIG. 6 is a diagram, in block and schematic form, of the power relay illustrated in FIGS. 1 and 2.

The power relay 11, as shown in the block and schematic diagram of FIG. 6, includes a pair of semiconductor switches, for example, triacs 60 and 61. Each of the triacs includes a pair of principal electrodes, an anode and a cathode, and a control or gate electrode. Triacs 60 and 61 are high-current rating triacs, for example, RCA types 40927, and are connected by lines 62, 63 and 64, respectively, in circuit with motor 12 and an alternating current source of power indicated at 65. Specifically, the principal electrodes of triac 60 are connected between a first terminal of the power source 65 and a first terminal of a first winding 66 of motor 12. The principal electrodes of triac 61 are connected between said first terminal of source 65 and a first terminal of a second winding 67 of motor 12. A capacitor 68 is connected between said first terminals of said windings 66 and 67. Both of the other terminals of said motor windings are connected by line 64 to the second terminal of source 65. Lines 62, 63 and 64 may be heavy-duty power lines that are capable of carrying, with little or no line losses, heavy currents that may be drawn by the motor 12 from source 65.

With this arrangement, when triac 60 selectively is rendered conductive by proper actuation of its gate circuit, alternating current from source 65 flows directly through motor winding 66 and in series with capacitor 68 and winding 67 to establish a rotating field in motor 12 that produces rotation in one direction. When triac 61 selectively is rendered conductive, the capacitor is placed in series with the motor winding 66 and a rotating field is established that produces motor rotation in the opposite direction.

Triacs 60 and 61 are selectively fired by triggering pulses that are adapted to be applied to their respective gate electrodes by an electronic control section indicated at 69. As is known, triacs 60 and 61 have the property of conducting substantially equally well in both directions in accordance with the alternations of the alternating voltage applied to their principal electrodes. Once fired conduction continues until the alternating voltage applied across their principal electrodes drops to zero. At this time, the current through said principal electrodes is zero.

Figure 7:
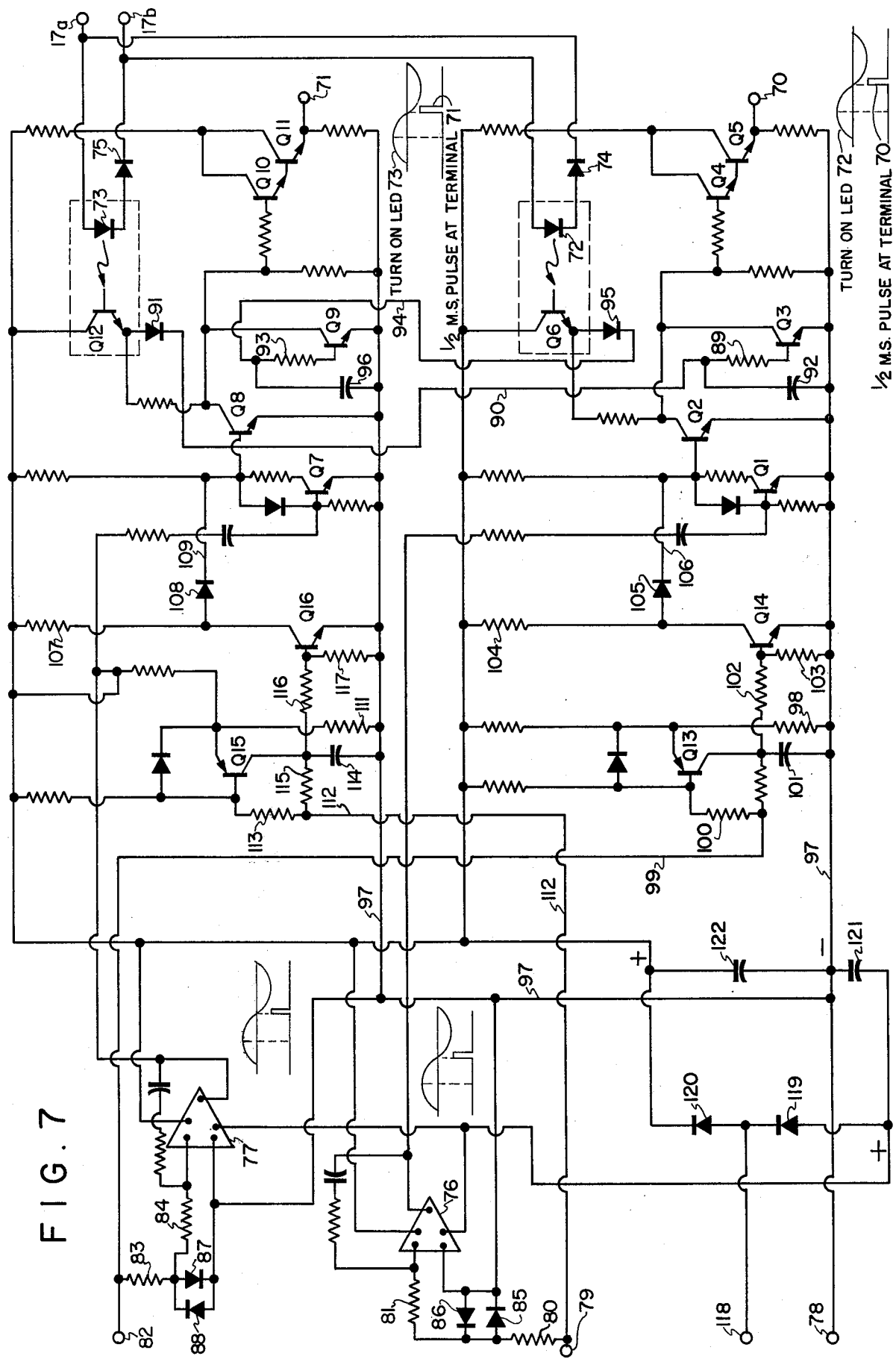
FIG. 7 is a schematic circuit of a preferred embodiment of the electronic control section of the power relay of FIGS. 1, 2 and 6.

By reference to FIGS. 6 and 7 it is seen that the electronic control section 69 is arranged, selectively in response to the time-proportioned current in transmission line 17a and 17b, to produce triggering voltage pulses for triacs 60 and 61, at output triac gate terminals 70 and 71. Specifically, with a current flow in one direction in transmisstion line 17a, 17b, a gating pulse is produced at terminal 70 to fire triac 60 and thereby energize motor 12 for rotation in one direction. With a current flow in the transmission line 17a, 17b in the opposite direction, a gating pulse is produced at terminal 71 to fire triac 61 and thereby energize motor 12 for rotation in the opposite direction. The gating pulses at terminals 70 and 71 have a time duration of approximately ½ millisecond, a time sufficiently long to ensure that the triac current is above the minimum holding current for the triac. Once a triac 60 or 61 is conducting or on, the gating pulses will occur each time the voltage across the triac is at zero, provided there is a command from control station 10 for the same control action, to keep the triac on, independently of the phase relationship of voltage and current of the load 12 connected to the triac.

Accordingly, the motor 12 is supplied from source 65 through triacs 60 and 61 with periodic pulses of alternating current power. The periodicity of these pulses is determined by the time-proportioning of the low voltage, low current signal in the transmission line 17a, 17b, and hence, by the frequency of the saw tooth wave produced by generator 46. These power pulses, moreover, are modulated in time duration as a function of the deviation or error in the process variable from the set point. In other words, the motor energization or duty cycle is varied as a function of deviation. As the deviation increases the motor duty cycle increases, that is, power pulses are supplied to the motor for a longer time, and vice versa. The direction of motor rotation is determined by which one of the triacs, 60 or 61, is activated to provide the said power pulses. The response or operation of the triacs to commands for control action received over transmission line 17a, 17b is illustrated by the wave forms of FIGS. 7A through 7D which are described hereinafter.

FIG. 7 is a schematic circuit diagram of a practical embodiment of the electronic control section shown in block form at 69 in FIG. 6. As is illustrated in FIG. 7, transistors Q1, Q2, Q3, Q4, and Q5 and a phototransistor Q6 comprise a gating circuit for producing a triggering pulse at terminal 70 for firing triac 60. Similarly, transistors Q7, Q8, Q9, Q10, and Q11 and a phototransistor Q12 comprise a gating circuit for producing a triggering pulse at terminal 71 for firing triac 61.

As shown in FIG. 7 optical isolators are provided for controlling these gating circuits in response to the commands for control action received over transmission line 17a, 17b. These optical isolators include photo transistors Q6 and Q12. These transistors are light-operted switches and may be of the type known commercially as the Monsanto MCT 26 phototransistor opto-isolator. Each of the optical isolators includes a light emitting diode (LED), LED 72 and LED 73 being associated with transistors Q6 and Q12, respectively. The light emitting diodes 72 and 73 are each connected to receive the time-proportioned current signal transmitted from the control station 10 over the two-wire transmission line 17a, 17b. The arrangement is such that with current flow in one direction LED 72 is illuminated to activate its associated phototransistor Q6. With current flow through the transmission line in the opposite direction, LED 73 is energized to illuminate and thereby activate the phototransistor Q12. To that end, the circuit to LED 72 includes a diode 74 and the circuit to LED 73 includes a diode 75. Thus, LED 72 and diode 74 are arranged to conduct when current flows in one direction in the transmission line 17a, 17b, and LED 73 and diode 75 are arranged to conduct when current flows in the opposite direction through that transmission circuit.

An important feature of the present invention resides in the circuitry that is provided for controlling the timing of the gating voltages at the terminals 70 and 71, which voltages fire, respectively, the triacs 60 and 61. These provisions include means such that gating voltage pulses at each of the terminals 70 and 71 are produced only at each zero cross over of the alternating voltage across the principal electrodes of the associated triac. These provisions also include means for inhibiting the operation of the said gating circuits in response to commands from the control station for reversing the direction of rotation of the motor 12, which commands occur too rapidly for the triacs 60 and 61 properly to respond without tending to cause damage to them. The provisions made also include means to monitor the responses of the triacs 60 and 61 to the commands received from the control station whereby, when they are not in accord, to avoid further firing of the triacs.

Specifically, the improved circuitry for firing the triacs 60 and 61 at zero cross over of the alternating voltage across the triacs includes a zero voltage detector comprising normally saturated differential input operational amplifiers 76 and 77. Amplifiers 76 and 77 are associated, respectively, with triacs 60 and 61. Thus, one input terminal of each of the amplifiers 76 and 77 is directly connected by way of a terminal 78 to the junction of a principal electrode of each of the triacs 60 and 61. The other principal electrode of triac 60 is connected by way of terminal 79 and series connected resistors 80 and 81 to the other input terminal of amplifier 76. Similarly, the other principal electrode of triac 61 is connected by terminal 82 and a pair of series connected resistors 83 and 84 to the second input terminal of amplifier 77. The junction of resistor 80 and 81 is connected by a pair of reversely connected voltage clipping diodes 85 and 86 to the first input terminal of amplifier 76. Similarly, the junction of resistors 83 and 84 is connected by a pair of reversely connected voltage clipping diodes 87 and 88 to the first input terminal of amplifier 77. Diodes 85, 86, 87 and 88 may be of the commercially available type IN 459. Amplifiers 76 and 77 may be of the commercially available type 741C.

With this arrangement, the operational amplifiers 76 and 77 remain saturated except when the alternating voltage across the principal electrodes of the associated triac 60 and 61, respectively, swings through zero. At that moment, the associated operational amplifier undergoes a rapid change from saturation with its output voltage at one polarity to saturation with its output voltage at the opposite polarity. As a result, a positive or a negative current pulse is introduced into the base of transistor Q1 or Q7 depending upon which of the operational amplifiers so changed state. Regardless of whether this current pulse is positive or negative, the change in state of the amplifiers 76 and 77, produces a negative current pulse into the base of transistor Q2 or Q8, which then operates to unclamp the base of transistors Q4, Q5 or Q10, Q11. This permits a current pulse to be delivered to the associated triac gating terminal 70 or 71. This action results, however, only if the associated gating circuit phototransistor Q6 or Q12 is on, provided further that a related transistor Q14 or Q16 to be described is on, and also that related transistor Q3 or Q9 is off.

Transistors Q13, Q14 and Q15, Q16, to which further reference is made hereinafter, are provided to prevent the simultaneous firing of both triacs 60 and 61. As will be understood, this feature is of especial importance in a motor reversing wiring arrangement of a triac pair such as is illustrated in FIGS. 6 and 7. The logic provided for monitoring when the triacs have not switched in accordance with input commands is of particular importance in connection with the use of triacs for driving motors to open and close process valves.

The transistors Q3 and Q9 are provided for the purpose of preventing the production of a gating pulse and the resulting turn-on of either triac 60 or 61 if the other triac has received a turn-on gating signal less than, for example, 20 milliseconds previously. This, then, provides at least a 20 millisecond delay after there has been driving action in one direction before a reverse driving action can occur. This is especially important in three phase drive, as illustrated in connection with FIG. 8, because both phases of previous direction of drive are allowed to turn-off before a reverse driving connection can be made. This circuit, however, does not prevent rapid pulsing of the triacs for operation in the same direction of drive.

In further explanation of the foregoing it will be noted by reference to FIG. 7 that the normally non-conductive transistor Q5 will not be rendered conductive to produce a triggering pulse for triac 60 at terminal 70 in response to activation of phototransistor Q3 by LED 72 unless the phototransistor Q12 is then not activated by the LED 73. If the phototransistor Q12 should then be in an activated state, the transistor Q3 will be biased to an on-condition and thereby maintain transistor Q4 and Q5 and in a clamped off condition, preventing a gating pulse from appearing at terminal 70. The biasing circuit for transistor Q3 includes a resistor 89, conductor 90, and a diode 91 which are connected between the base of transistor Q3 and the emitter of phototransistor Q12. A capacitor 92 is connected between the emitter of transistor Q3 and the end of resistor 89 that is remote from the base of that transistor. Similar circuit components and connections, including a resistor 93, conductor 94, diode 95 and capacitor 96 are provided in association with transistor Q9 and the phototransistor Q6 for preventing the production of a triggering voltage at the terminal 71 notwithstanding activation of the phototransistor Q12 by the LED 73, if simultaneously the phototransistor Q6 is activated by the LED 72.

Capacitors 92 and 96 are operative to delay for approximately 20 ms the application of a motor reversing triggering pulse to the terminal 70 or 71, respectively, if immediately prior to such application a triggering pulse has been produced at the other terminal 71 or 70. This avoids rapid alternation in the firing of the triacs 60 and 61 and thereby eliminates or minimizes hunting. Importantly, also, this prevents simultaneous turn on of both triacs which might tend to occur because of the property of triacs continuing to conduct, once turned on, until the current through triac returns to zero. This lock-out feature does not prevent, however, rapid turning off and on of either of the triacs 60 and 61 to provide for operation of the motor 12 in the same direction as the motor previously has been energized for operation.

Transistors Q13, Q14 are inhibit transistors which prevent the production of a firing pulse at the terminal 70 and thereby firing of triac 60 if the open circuit voltage across the triac 61 that is then not being fired, is not 3 volts or more, and moreover, has not had such a value for at least 20 milliseconds. Transistors Q15, Q16 are similarly inhibit transistors to prevent firing of the triac 61 if the open circuit voltage across the triac 60 is not then and has not been more than 3 volts for at least 20 milliseconds. With this arrangement, if either triac 60 or 61 had previously been overloaded or damaged in a fused condition, the other triac will not be fired. The inhibiting actions of the transistors Q13, Q14, and Q15, Q16 take place at zero crossing only.

Specifically, as shown in FIG. 7, transistors Q13 and Q14 are responsive to the voltage across the principal electrodes of triac 61 by virtue of the connection 97 from terminal 78 including resistor 98 to the emitter of transistor Q13 and the connection 99 from terminal 82 including resistor 100 to the base of transistor Q13. A capacitor 101 is connected in the collector circuit of transistor Q13 and also in the base-emitter circuit of transistor Q14 by way of a resistor 102 and conductor 97. A resistor 103 is connected between base and emitter of transistor Q14. Thus, when the open circuit voltage across triac 61 is more than 3 volts, the transistors Q13, Q14 will be turned on. This will turn off transistor Q2 which normally is clamped on by a circuit connection including a resistor 104 in the collector circuit of transistor Q14, diode 105 and conductor 106. Similarly, turning on of transistor pair Q15 and Q16 as a result of the voltage across triac 60 being more than 3 volts results in transistor Q8 being unclamped. Transistor Q8 normally is biased in a clamped condition by a circuit including a resistor 107, diode 108 and a conductor 109. The circuitry that makes transistors Q15, Q16 responsive to the voltage across triac 60 includes conductor 97 which connects terminal 78 by way of a resistor 111 to the emitter of transistor Q15, a conductor 112, a capacitor 114 and resistors 113, 115, 116 and 117.

Summarzing the foregoing, at zero crossing of the alternating voltage across either of the triacs 60 or 61, if the then open circuit voltage across the other triac is 3 volts or more, unclamping of the respectively associated transistor Q2 and Q8 results. If the associated phototransistor Q6 or Q12 is then activated, the transistor Q2 or Q8 is effective under the conditions stated to transmit a signal that may result in the production of a triac trigger pulse at terminal 70 or terminal 71, respectively. Whether such trigger pulse is immediately produced or produced at all, however, depends upon whether the other phototransistor Q12 or Q6 is then energized or has been previously energized within a period of no less than 20 milliseconds. Such energization of the opposite phototransistor will inhibit the phototransistor that has just come on to provide a delay in reversal of the trigger pulses applied to the terminal 71 or 70, as well as to lock out and prevent a trigger pulse at either of said terminals in the event that both of the phototransistors are simultaneously activated.

As shown, d-c power is supplied for the circuitry of FIG. 7 form a 12 volt alternating current supply source comprising terminal 78 and a terminal 118. The d-c supply means include a pair of rectifiers 119 and 120 and a pair of capacitors 121 and 122. The arrangement is such that the junction of capacitors 121 and 122 is connected by conductor 97 to terminal 78. This junction comprises the common negative terminal of the d-c power supply. The junctions of the rectifier 119 and condenser 121 forms one positive terminal and is shown supplying power to the operational amplifiers 76 and 77. The junction of the rectifier 120 and capacitor 122 forms another positive terminal and is shown supplying power to other circuit components of FIG. 7.

Referring to the equivalent circuit diagram of FIG. 6A it will be seen that the field windings of motor 12 each include inductive and resistive components and that a mutual inductance component also is present. The inductive and resistive components of winding 66 are indicated in FIG. 6A by the letters L1 and R1, respectively. Similarly, the inductive and resistive components of the winding 67 are indicated by the letters L2 and R2, respectively. The mutual inductance component is indicated by the letter LM.

Referring to FIG. 7A, the curve A represent the voltage $V_1$ of the alternating current power source 65. The source 65 may be of a commercially available frequency. Curve B represents the signal pulse transmitted to the input terminals of the power relay 69 by the transmission line 17a, 17b. This pulse is shown reversed in polarity at the time $T_1$, the reversal in the curve indicating a reversal in motor drive at that time. The wave forms $V_1$, $V_2$ and $V_c$ represent the alternating voltages that appear across the circuit portions as indicated in FIG. 6A. The curves $i_1$ and $i_2$ represent, respectively, the currents through the motor windings 66 and 67 and the curve $i_T$ represents the total current through the motor windings. The left hand portions of these voltage and current curves show the conditions that result in response to the command for drive in one direction, for example, the forward direction represented by the positive portion of curve B. Similarly, the right hand portion of the voltage and current curves show the conditions for reverse drive.

In FIG. 7B the curves A and B represent the voltages $VA_1$ and $VA_2$, respectively, across the triacs 60 and 61, as seen in FIGS. 6 and 6A. The curves C and D represent the currents through the triacs 60 and 61.

Figure 7C:
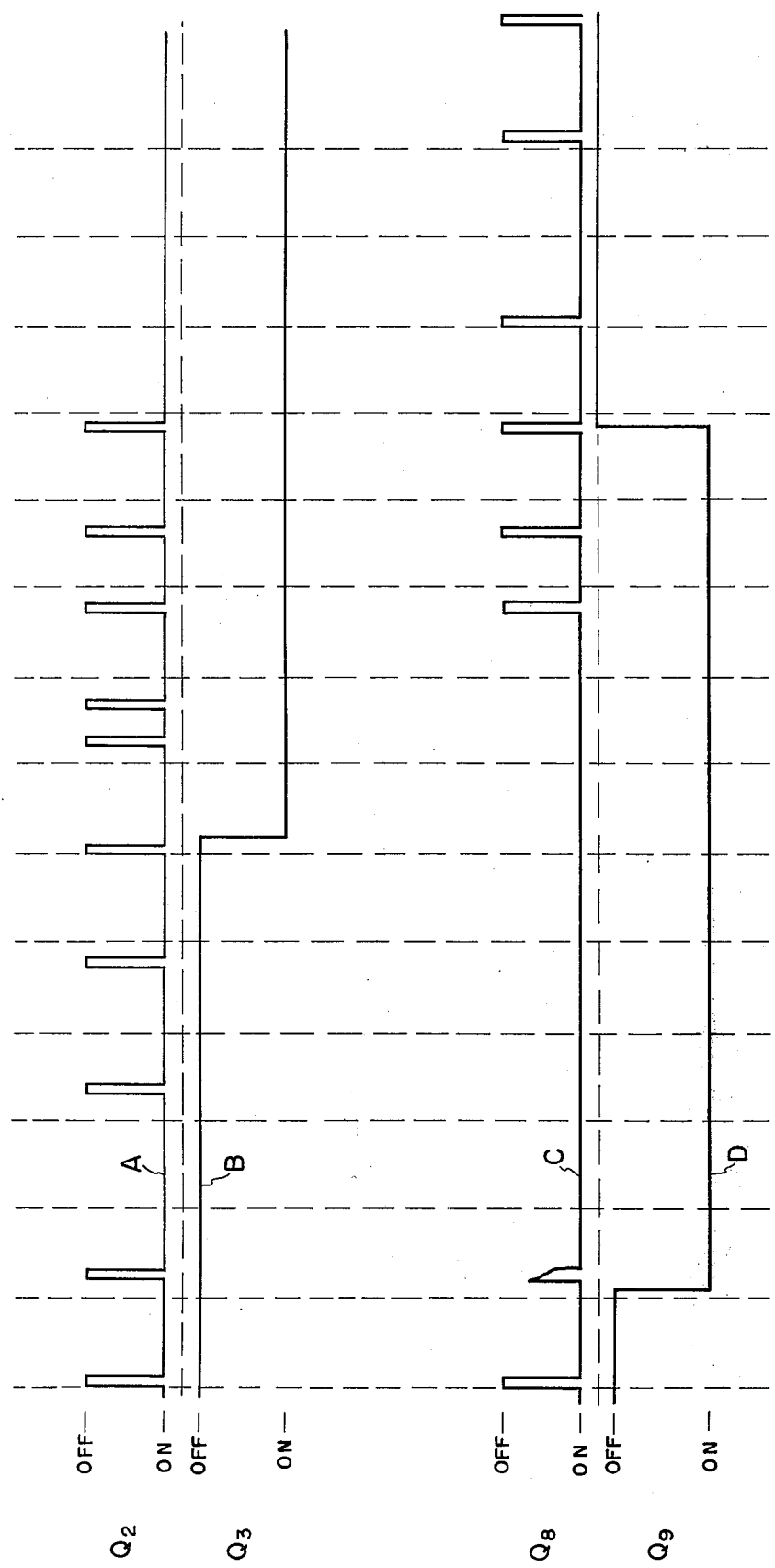

In FIG. 7C, the curves A and B represent, respectively the state of condition of the gating transistorss Q2 and Q3. Similarly, the curves C and D of FIG. 7C represent the state of conduction of the gating transistors Q8 and Q9. In FIG. 7D, the curves A and B represent the current pulses provided at the outputs of the amplifiers 76 and 77, respectively, responsively to zero voltage crossing across the triacs 60 and 61, respectively. Curves C and D, in FIG. 7D, represent the current flow through the diodes 105 and 108. The current to the gate circuits of the triac 60 and 61 is represented by the curves E and F from the terminals 70 and 71, respectively, as seen in FIGS. 6 and 7.

Summarizing the foregoing, it is seen that the power relay 69 as illustrated in FIGS. 6 and 7 provides control of a pair of triacs, and thereby the operation of a single phase reversible alternating current electrical motor, in a manner that is particularly useful in effecting proportional speed floating control. Thus, the apparatus operates to provide a direct current actuating triggering pulse to the gate of a triac in response to a command signal received by an optical isolator. The triggering pulse to the triac is inhibited, however, if conditions are such that the triac should not be turned on at that time. Such conditions include a state in which the voltage across the triac to be turned on is not passing through its zero state, and a condition in which the voltage across the other, reverse drive, triac is not a predetermined value, for example, at least 3 volts. This in the first instance, avoids firing a triac while the voltage across its principal electrodes is undergoing a rapid rate of change, and, in the second instance, avoids firing a triac while the other triac is still conducting. Another condition in which the triggering pulse to the triac to be fired is inhibited is the condition wherein simultaneous commands for motor operation in both directions are received by both optical isolators, and results in neither of triacs 60 and 61 receiving a triggering pulse. A further condition is the requirement of a delay of at least 20 milliseconds upon a command for reversal before a triggering pulse which will cause such reversal can be provided to the other triac.

Figure 9:
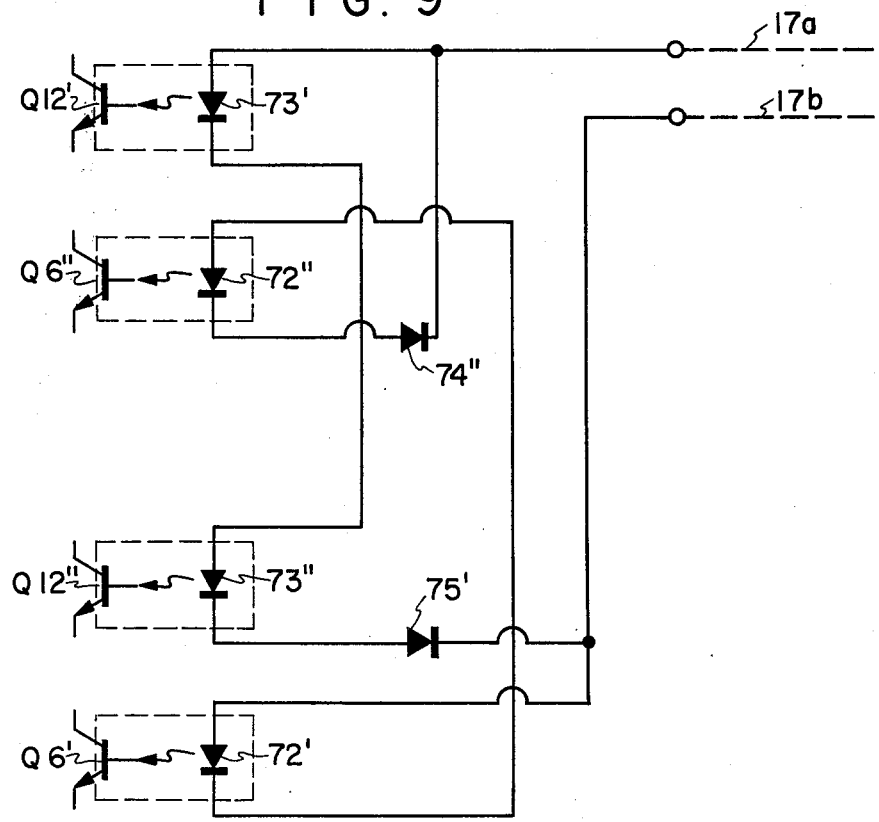
FIG. 9 is an illustration of the connection of the photo-transistor optical isolators of the electronic control sections of the power relay illustrated in FIG. 8.
Figure 8:
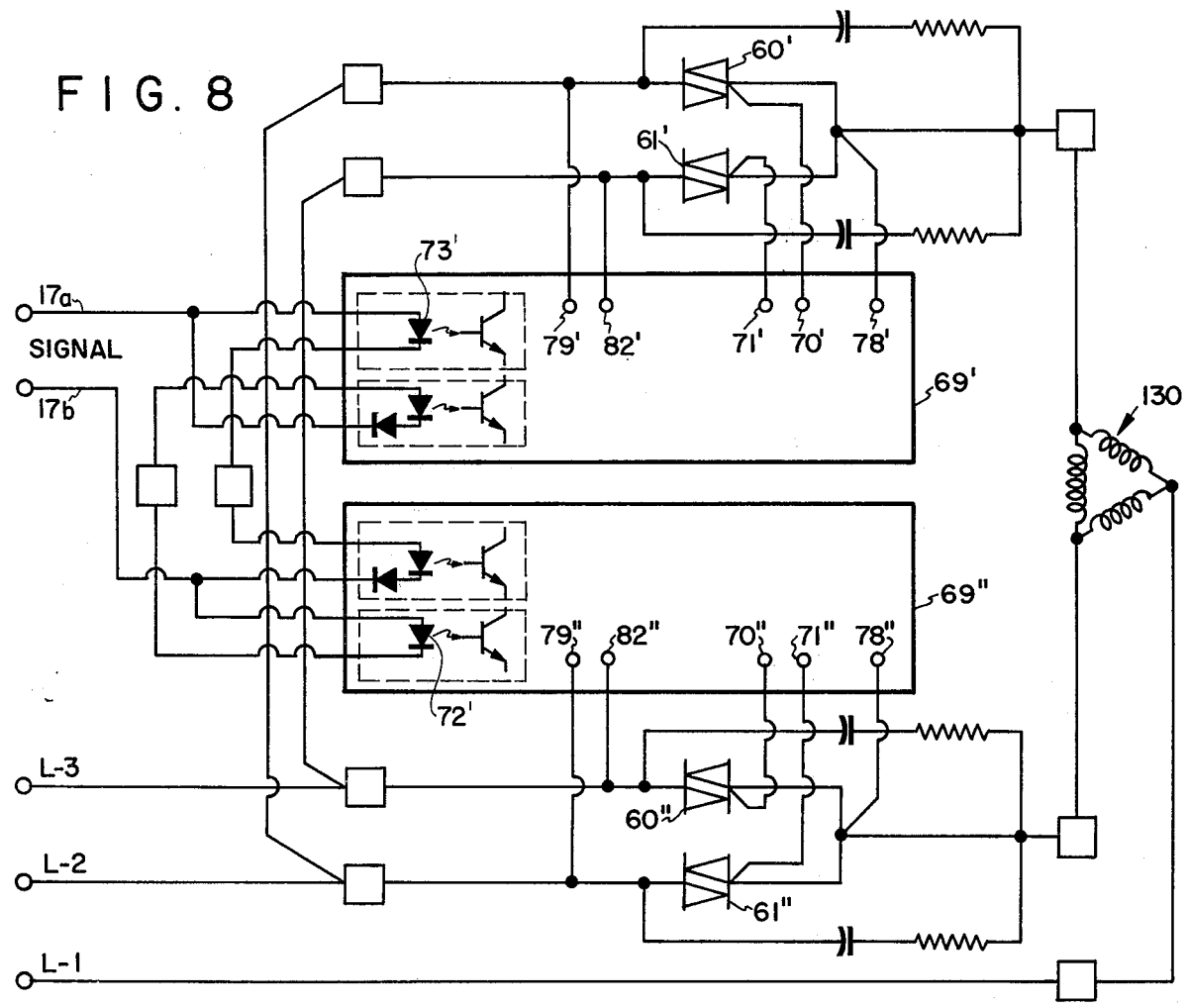
FIG. 8 illustrates a three-phase system modification of the power relay embodying the present invention.

FIG. 8 illustrates a three-wire, three phase supply, L-1, L-2 and L-3 connected to a delta-connected load 130 with two electronic controller sections 69' and 69'', each of which sections may be similar to the controller section 69 of FIG. 6. The controller sections 69 and 69 are shown in block diagram form arranged selectively to control the current to the load on lines L-2 and L-3. Each of the controllers 69' and 69'' is arranged to be responsive to the d-c time-proportioned signal that is produced, for example, at a control station, not shown, such as the control station 10 illustrated in FIGS. 1 and 4. Thus, with a current signal of one polarity from the control station, the associated phototransistor 72' and 72'', as shown in FIG. 9, are activated, in conjunction with individually associated gating circuits, to produce trigger signals at the respectively associated output terminals 70' and 70''. With a current signal of the opposite polarity the associated phototransistors 73' and 73'', as seen in FIG. 9, are activated in conjunction with individually associated gating circuits to produce trigger signals at the respectively associated output terminals 71' and 71'' of the controller section 69' and 69''.

FIG. 8 shows four triacs 60', 61', 60'' and 61'', connected in circuit with the three phase supply L-1, L-2 and L-3, as a reversing control for a three-phase reversible electrical motor indicated at 130.

By the use of the zero crossing and interlock circuitry described in connection with FIG. 7, each of the triacs illustrated in FIG. 8 receives a gate triggering signal only when the voltage across the said triac is zero, the current through it is zero, the voltage across the reverse driving triac is 3 volts or more, and the associated phototransistor is activated. As a result, a triac will turn on only on zero voltage crossing across the triac and turn off only on zero current crossing through the triac. The operation of the triacs, therefore, is independent of phase relationship of voltage and current of the load.

In the apparatus of FIG. 8, energization of the three phase motor 130 in one direction is effected by the selective and sequential firing of triacs 60' and 60''. Operation in the reverse direction is accomplished the selective and sequential firing of the triacs 61' and 61''. As in the embodiment of the invention described in connection with FIG. 7 shorting of any of the supply lines by the possible simultaneous triggering of triacss 60', 61', or 60'', 61''', and consequent damage thereto, is precluded. Note, in this connection that the triacs 60', 60'' and 61', 61'' each have their common terminal associated with the load, motor 130, as distinguished from the apparatus of FIG. 6 in which the triacs 60, 61 have their common terminal associated with a power source terminal. Since the associated triacs 60', 60'' or 61', 61'' can never be on simultaneously, this precludes shorting of three phase power lines.

In the operation of the arrangement of FIG. 8, the energization of the delta connected motor windings for rotation of the motor in one direction is effected by the simultaneous switching on by the phototransistors Q6', Q6'', triacs 60' and 60'' in response to current flow in one direction in transmission line 17a, 17b, as seen in FIG. 9. For operation in the reverse direction, the energization of the delta connected motor windings is effected by the simultaneous switching on by the phototransistors $Q_{12}'$ and $Q_{12}''$ of the associated triacs 61' and 61'' in response to current flow in the opposite direction in line 17a, 17b. In each case the actual triggering of the triacs 60', 60'' or 61', 61'' for firing is at each zero cross over of the alternating voltage and current across the principal electrodes of the triac.

The lock-out optical isolator time constant in each of the electronic controllers 69' and 69'', preferably is made long enough for example, 20 to 40 milliseconds, to prevent rapid reversal of the direction of the three phase motor 130 so that there is time for all phases to open for rotation in one direction of drive before a reverse drive is obtained. This time constant also reduces the tendency to hunting or alternate up and down drive when the motor has the final valve element positioned near to that valve position required for zero deviation of the process variable from the desired set point and also avoids line-to-line shorting of the power lines. This lock-out time delay does not prevent rapid turn on and turn off of the triacs for operation of the motor in the same direction of drive. The optical isolator lock-out also prevents simultaneous turn on upon rapid reversal of command signals because each optical isolator circuit will lock out the opposite optical isolator before its input turn on level becomes large enough to open the gate of its own triac.

In the equivalent circuit diagram of FIG. 8A, the field windings of Motor 130 are each shown as having inductance and resistive components. these components for a first winding are designated L1, R1, for a second winding are designated L2, R2 and for the third winding are designated L3, R3. For convenience of illustration, mutual inductance components that may be present are not shown.

Figure 9A:
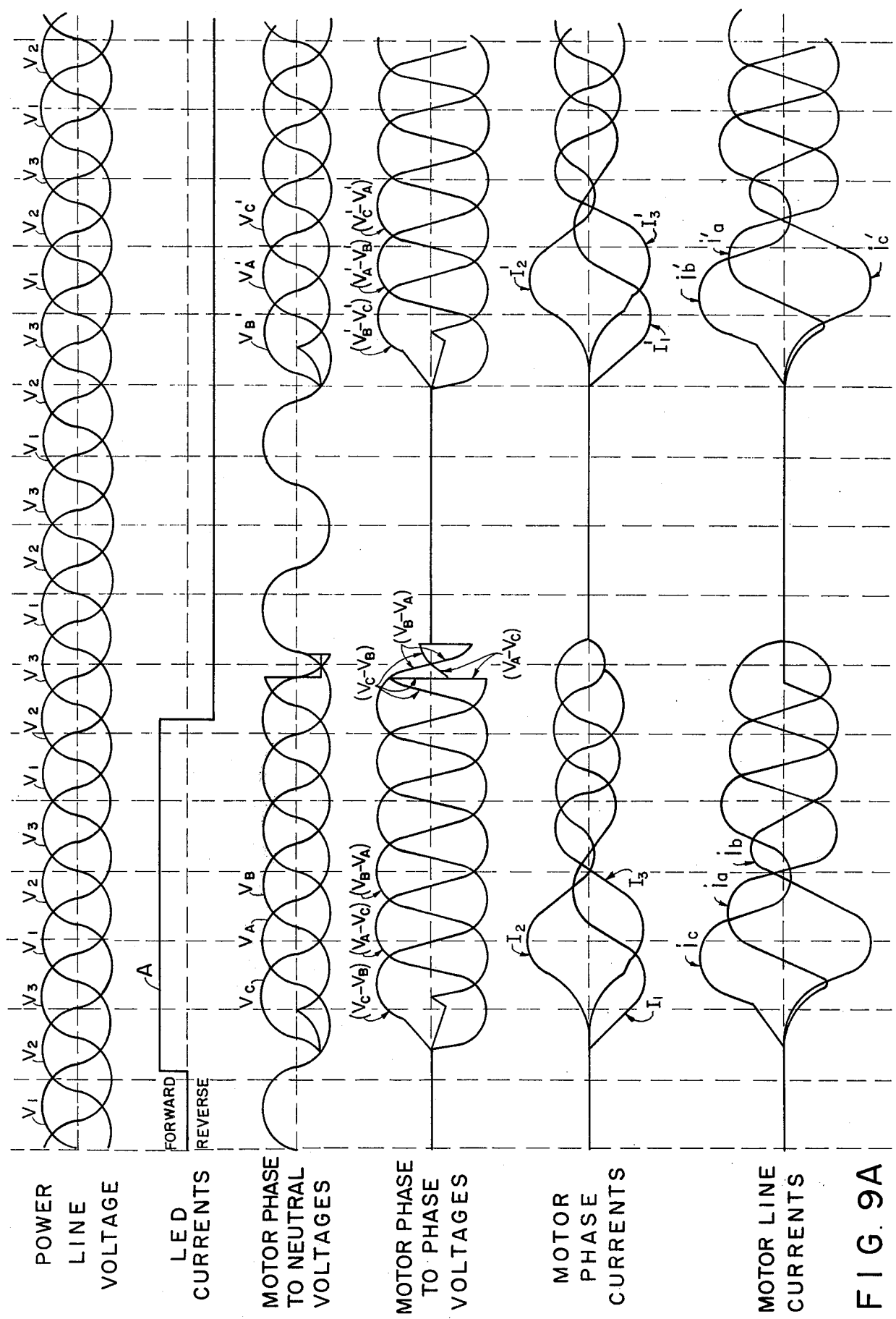

The power line voltages $V_1$, $V_2$, and $V_3$ applied to the motor 130 are represented in FIG. 9A by the correspondingly identified curves. The curve A in FIG. 9A represents the current pulses in the transmission line 17a, 17b that flow through the light emitting diodes 72', 72'' or 73', 73'' depending upon the direction of such flow. For convenience of illustration such current flow in one direction has been indicated in the left hand portion of FIG. 9A as commanding operation of the motor 130 in a FORWARD direction, and current flow in the opposite direction, as indicated in the right hand portion, as commanding such motor operation in the "REVERSE" direction. The motor phase to neutral voltages have been illustrated in FIG. 9A by the designations $V_A$, $V_B$, and $V_C$ for operation of the motor in the FORWARD direction. For operation of the motor in the REVERSE direction, the corresponding voltages have been designated by the characters $V_B'$, $V_A'$ and $V_C'$. The motor phase to phase voltages, as seen in FIG. 8A, are represented in FIG. 9A, by the designations $(V_C - V_A)$, $(V_A - V_C)$, and $(V_B - V_A)$ for operation of the motor in the FORWARD direction. For operation of the motor in the REVERSE direction the motor phase to phase voltage bear the designations $(V'_B - V'_C)$ $(V'_A - 132 V'_B)$ and $(V'_C - V'_A)$. The motor phase currents are indicated in FIG. 9A by the designations $I_1$, $I_2$ and $I_3$ for operation of the motor 130 in the FORWARD direction. For operation in the REVERSE direction the currents have been similarly indicated with a prime character added. The motor line currents have been indicated in FIG. 9A by the designation $i_a$, $i_b$, and $i_c$ for operation in the FORWARD direction. For operation in the REVERSE direction the motor line currents are similarly indicated with prime characters added.

Figure 9B:
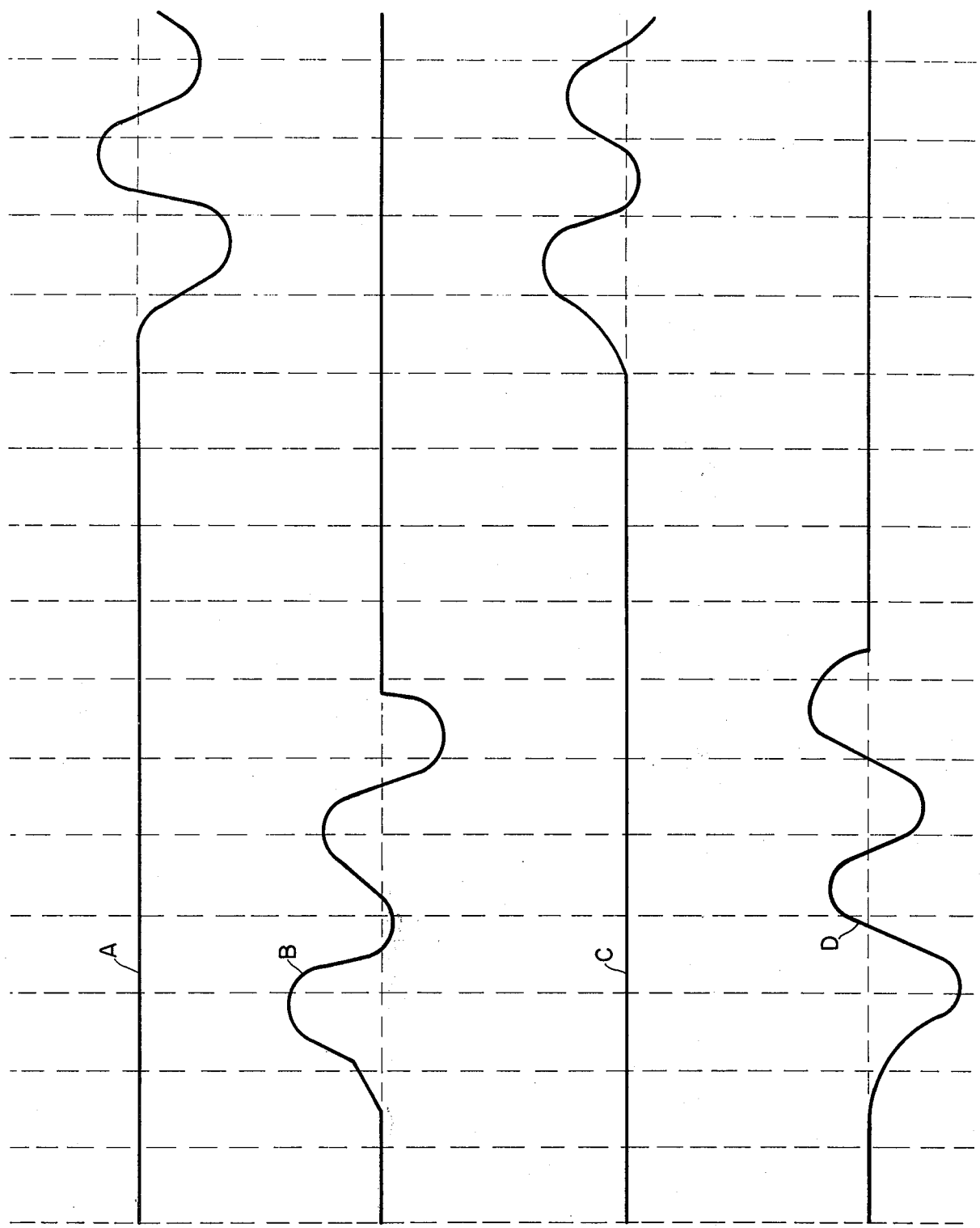

In FIG. 9B the curves, A, B, C and D represent, respectively the output currents of the triacs 60', 61', 60'' and 61''. Thus, for operation in the FORWARD direction the triacs 61' and 61'' are shown as having output currents, while for operation in the REVERSE direction the triacs 60' and 60'' are shown as having output currents.

Figure 9C:
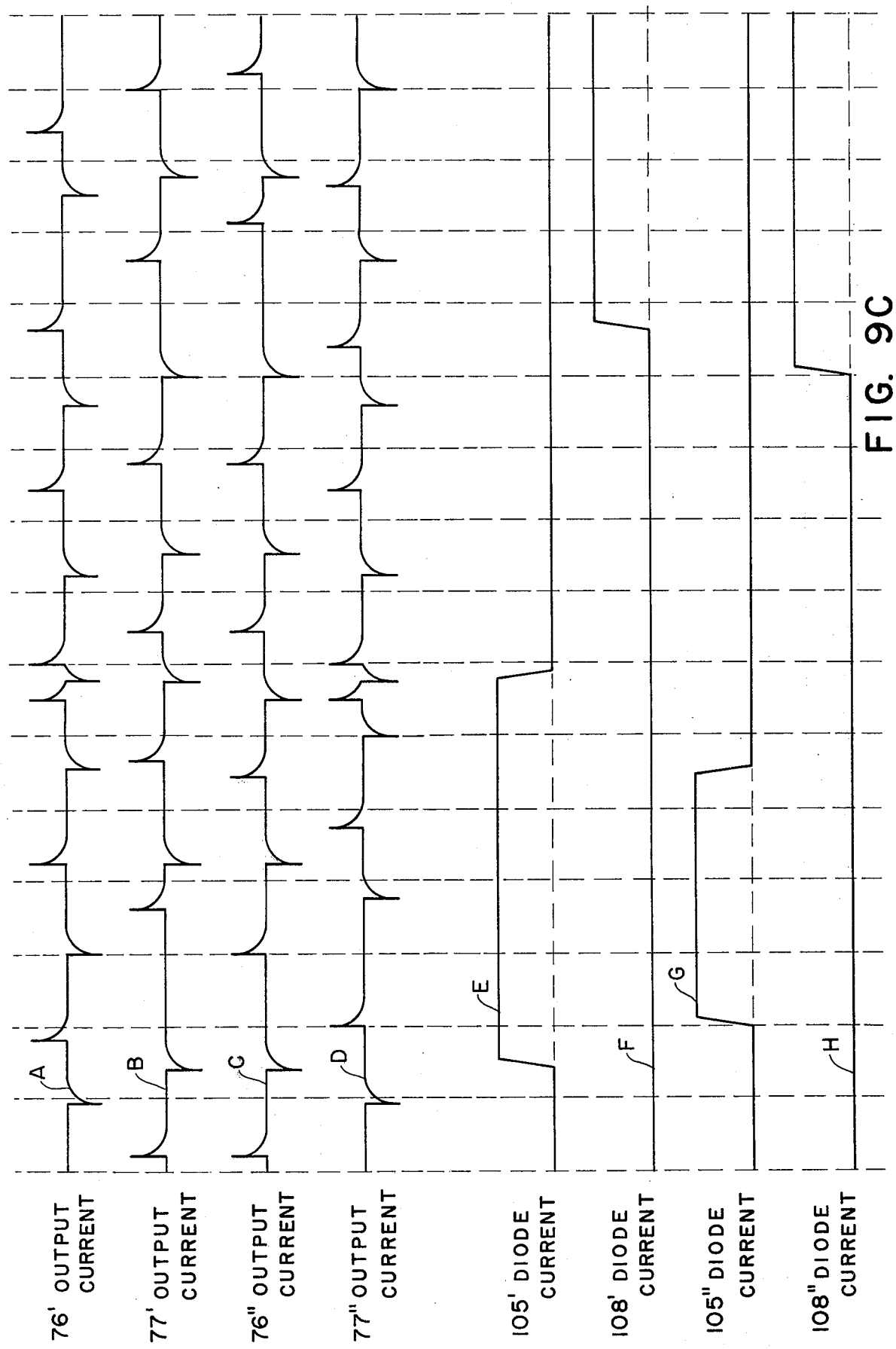

In FIG. 9C the curves A, B, C, and D represent the output current pulses produced by the amplifiers 76', 77', 76'' and 77''. Amplifiers 76' and 77' are embodied in control section 69', and amplifiers 76'' and 77'' are embodied in control section 69'', as seen in FIG. 8. The current through the diodes 105', 108', 105'' and 108'' are represented in FIG. 9C by the curves E, F, G, and H.

In FIG. 9D the curves A, B, C, D, E, F, G, and H represent the state of conduction of the gating transistors $Q_2'$, $Q_3'$, $Q_8'$, $Q_9'$, $Q_2''$, $Q_3''$, $Q_8''$ and $Q_9''$. These curves collectively show the conditions that obtain for the gating transistors upon a command for operation of the motor 130. Thus, the curves B and F show that the transistors $Q_3'$ and $Q_3''$ are both in an on state for operation of the motor in the FORWARD direction, while the transistors $Q_9'$ and $Q_9''$ are both in an on state for operation of the motor in the REVERSE direction.

In FIG. 9E the curves A, B, C, and D represent, respectively, the current pulses from the terminals 70', 71', 70'' and 71'' to the corresponding associated triacs 60', 61', 60'' and 61''.

In accordance with a further feature of the invention, if the final control element or value is not being driven in accordance with input commands, a circuit breaker is opened and an alarm is sounded, if desired, manual control may be established. Such a monitor is illustrated in connection with the schematic diagram of FIG. 10.

Figure 10:
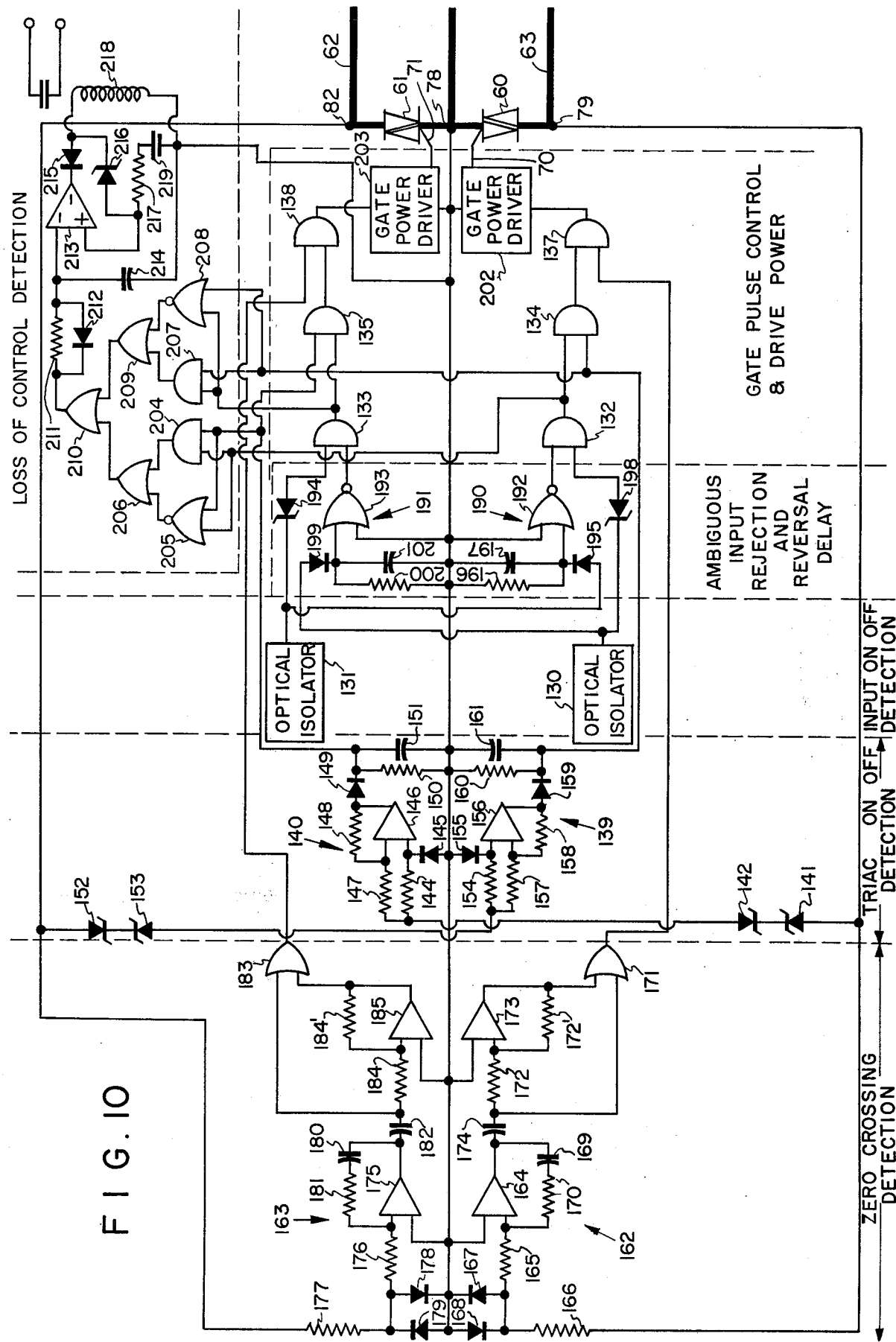
FIG. 10 is a schematic circuit diagram illustrating the control logic associated with the pair of triacs in the apparatus of FIGS. 6 and 7.

FIG. 10 is a logic diagram and illustrates the control logic associated with each pair of triacs in a modified form of the electronic controller illustrated at 69 in FIGS. 6 and 7. That is to say, FIG. 10 shows the interrelated logic used in the control of the triac pair in effecting the selective energization of the triacs and their duty cycle as required to energize the reversible electrical motor driven thereby in a direction and at a speed depending upon the deviation of the process variable under control from the desired set point.

By reference to FIG. 10 it is seen that the circuit arrangement is such that only one triac of a pair will be turned on at any particular instant of time thereby ensuring that no short circuit condition can occur between the two non-common anodes of the triacs. In FIG. 10 standard logic symbols have been employed. The symbol used are as follows:

 = Operational amplifier or comparator

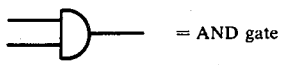 = AND gate

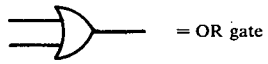 = OR gate

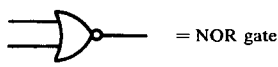 = NOR gate

By way of illustration and example, and not by way of limitation, it is noted that the several circuit components or devices shown in symbolic form in FIG. 10, may, if desired, be of the Series 54/74 TTL IC logic family as described in the publication "Designing with TTL Integrated Circuits," published by Texas Instruments Incorporated McGraw-Hill Book Company (Copyright 1971). The Operational Amplifier or Comparator may be a type 741.

As will be apparent to those skilled in the art upon inspection and study of the diagram of FIG. 10, for a given triac 60 or 61 there will be no gate triggering pulse at the associated output terminal 70 or 71 unless all of the following conditions are met simultaneously:

1. The corresponding optical isolator 130 or 131 is on to open the respectively associated first AND gate 132 or 133;

2. The input command signal of the other optical isolator 131 or 130 for the opposing triac 61 or 60 must be off and must have been off for a specified period of time, for example 30 milliseconds, to open the second AND gate 134 or 135. The outputs of AND gates 134 and 135, as shown, are applied, respectively, to an associated first input terminal of AND gates 137 and 138;

3. There must exist an alternating voltage of amplitude of, for example, 3 volts or greater across the opposing triac 61 or 60, indicating that the latter is off, to open an associated third AND gate 137 or 138; and 4. The alternating voltage across the triac 60 or 61 to be turned on must just have crossed through zero volts.

Referring to FIG. 10, triac on-off detection circuits are illustrated, respectively, at 139 and 140. Thus the detection circuit 140 includes a circuit between the terminals 79 and 78 including a pair of back-to-back connection Zener diodes 141 and 142, resistor 144 and diode 145. The junction of the latter elements is connected to one input terminal of operational amplifier 146. The other input terminal of amplifier 146 is a summing junction and includes a resistor 147 which is connected to the junction of resistor 144 and zener diode 142, and a resistor 148 in a feedback circuit of the amplifier. The output circuit of the amplifier includes a diode 149 and a parallel connected resistor 150 and capacitor 151. The voltage across the capacitor 151 is applied to one input terminal of AND gate 135.

The detection circuit 139 includes similar components between circuit terminals 82 and 78 and including back-to-back connected Zener diodes 152 and 153, resistor 154 and diode 155. Circuit 139 includes a similar operation amplifier 156, resistors 157 and 158, a diode 159 and parallel-connected resistor 160 and capacitor 161. The voltage across the capacitor 161 is applied to one input terminal of AND gate 134.

Zero crossing detection amplifier circuits 162 and 163 are provided to sense crossing through zero volts of the alternating voltage across the triac 60 or 61 that is individually associated therewith. Circuit 162, as shown, includes an operational amplifier 164 having one input terminal connected through resistors 165 and 166 to the terminal 79. The junction of the resistors 165 and 166 are connected through a pair of back-to-back diodes 167 and 168 to other input terminals of amplifier 164. The said other input terminal of amplifier 164 is also connected to the common terminal 78. The output terminal of the amplifier 164 is connected through a capacitor 169 and a resistor 170 to the first mentioned input terminal of the amplifier. The said output terminal is also coupled by a capacitor 174 to one input terminal of an OR gate 171 and through a resistor 172 to the input terminal of an inverting operation amplifier 173, the other input terminal which is connected to the common terminal 78. The output terminal of the amplifier 173 is connected to the other input terminal of OR gate 171 and also to the first mentioned input terminal of amplifier 173 by a resistor 172'. A change in state on the output of operational amplifier 164 causes a positive pulse at the output of OR gate 171. The time of that pulse is determined by the time constant of capacitor 174 and resistor 172.

Similarly, the zero crossing detection circuit 163 includes an operational amplifier 175 and resistors 176 and 177 which connect one input terminal of the amplifier to the terminal 82. The circuit 163 also includes back-to-back connected diodes 178 and 179 which are connected between the junction of resistors 176 and 177 and the other input terminal of amplifier 175, which input terminal also is connected to the common terminal 78. A series connected capacitor 180 and resistor 181 are connected between the output of the amplifier 175 and the first mentioned input terminal thereof. The output of amplifier 175 also is coupled by a capacitor 182 to one input terminal of an OR gate 183 and also by a resistor 184 to one input terminal of an inverting operational amplifier 185. The other input terminal of amplifier 185 is connected to the common terminal 78. The output terminal of amplifier 185 is connected to the other input terminal of OR gate 183.

The output terminals of the OR gates 171 and 183 are connected to the second input terminals of an individually associated AND gate 137 and 138. With this arrangement, the respective zero voltage detecting amplifier 162 or 163 switches only when the voltage across the corresponding triac 60 or 61 is within 20 milli volts of being zero. Upon such switching, the amplifier 162 or 163 opens the individually associated AND gate 137 or 138, to permit firing of the corresponding triac 60 or 61, in response to a command from the associated optical isolator 130 or 131, for a period of time as established by an RC timing circuit 174, 172 or 182, 184, generally about one-half millisecond.

It will be noted that the time constant of the circuit 139 and 140 which detects the presence of an alternating voltage greater than 3 volts across the respectively related triac 61 or 60 is only a couple of milliseconds long, that is, just long enough to keep the associated AND gate 137 and 138 open during the short period of time that the voltage across the triac 61 or 60 that is not fired, swings through zero.

The time constant on the output of the optical isolator 130 or 131 which closes the gate to the associated triac 60 or 61 to be fired, is so designated as to prevent a triac 60 or 61 from being turned on long enough to fire when, due to rapid change of command, the other optical isolator almost simultaneously directs the closing of the related gating circuits for the firing of the other triac. This lock-out optical isolator time constant is made long enough, for example, 100 milliseconds, to prevent rapid reversal of the direction of motor drive. Such time constant reduces alternate up and down drives in an automatic control system wherein the motor has the final control element or valve positioned near its correct value, and is of particular utility in a three-phase motor control arrangement in that it allows time for all phases to open in one direction of drive before a reverse drive is permitted. This lock-out time delay, however, does not prevent rapid turn-on and off of a triac in the same direction of drive. The optical isolator lock-out also prevents simultaneous turn-on of the triacs because each optical isolator circuit will lock-out the opposite optical isolator before its input turn-on level becomes large enough to open up the gate of its associated triac.

The circuit provisions in FIG. 10 for preventing the aforementioned possible ambiguous control action commands for reversal includes circuits indicated at 190 and 191. Thus the circuit 190 includes a NOR gate 192 and the circuit 191 includes a NOR gate 193. As shown, the output of optical isolator 131 is connected by a Zener diode 194 to one input terminal of AND gate 133 and is also connected by a diode 195 and a parallel connected resistor 196 and capacitor 197 to one input terminal of the NOR gate 192, the other input terminal of which is connected to the common terminal 78. The other one input terminal of NOR gate 192 is connected to the junction of diode 195 and resistor 196. The output of NOR gate 192 is connected to the second input terminal of AND gate 132.

Similarly, the output terminal of optical isolator 130 is connected by a Zener diode 198 to the first input terminal of AND gate 132 and is also connected by a diode 199 to a first input terminal of NOR gate 193. That input terminal of the NOR gate 193 is connected by a parallel connected resistor 200 and a capacitor 201 to the common terminal 78. The second input terminal of NOR gate 193 is directly connected to the common terminal 78. The output terminal of NOR gate 193 is connected to the second input terminal of AND gate 133. The output terminals of AND gate 132 and 133, are connected to the second input terminal of each of the AND gates 134 and 135, respectively.

The output terminal of the AND gates 137 and 138 are each connected to an individually associated gate driver shown at 202 and at 203, respectively. The gate drivers 202 and 203 supply triggering pulses to the triacs 60 and 61, respectively. As has been explained, a gate triggering pulse appears at the gate of the triacs 60 and 61 only when all of the conditions described hereinbefore have been met simultaneously.

The circuit arrangement illustrated in FIG. 10 also includes a so-called loss of control monitor. Such a monitor is desirable if, for example, one of the optical isolators 130 or 131 is turned on and an associated triac doesn't fire within a specified time, the only exception being when both optical isolators are turned on simultaneously. In such event, a circuit trip is actuated to indicate or open the power circuit to prevent valve movement, or both. The only exception to such monitoring control action in the arrangement illustrated is when both optical isolators are turned on at the same time. The circuitry for providing the foregoing control function includes an AND gate 204 and a NOR gate 205 each of which has a first input connected to the output of on-off detection circuit 140 and the other input connected to the output of AND gate 132. The output of AND gate 204 is connected to one input of an OR gate 206 and the output of NOR gate 205 is connected to the other input of OR gate 206. A first input of an AND gate 207 gate 207 and a NOR gate 208 are each connected to the output of AND gate 133 and the second input of said gates 207 and 208 are each connected to the output of on-off detection circuit 139. The output of AND gate 207 is connected to one input of an OR gate 209, and the output of NOR gate 208 is connected to the other input of OR gate 209. The output of the OR gates 206 and 209 are each connected to an individually associated input of an OR gate 210, the output of which is connected by a resistor 211 and a parallel connected diode 212 to one input terminal of a comparator amplifier 213. That input terminal of amplifier 213 also is connected by a capacitor 214 to the common terminal 78. The other input terminal of amplifier 213 is connected to the output terminal thereof by a diode 215 and a Zener diode 216. Connected in the output of amplifier 213 also is a resistor 217, a relay 218, and a source of direct current power indicated at 219. Resistor 211 and capacitor 214 provide a time delay for the voltage driving the comparator amplifier 213.

The operation of the loss of control trip relay will be apparent to those skilled in the art. The basic function is that the loss of control circuit monitors the state of the optical isolators to determine if a triac 60 or 61 should be on or off, and also monitors whether or not the triac 61 or 60 has an alternating voltage greater than 3 volts across its principal electrodes If the triac input command and triac output response differ for a prolonged period of time, for example 50 milliseconds, as predetermined, the loss of control relay will operate. Because of the triacs wait for zero crossing to open or close, it should be understood that it is normal for the input command and output response to differ for short periods of time, for example, up to 10 milliseconds and for this reason the time out on disagreement is not cumulative but is reset after each time agreement occurs.

In addition to requiring a long period of disagreement before the relay trips the loss of control circuit, desirably the latchup feature including the Zener diode 216 ensures a trip action that is positive once it occurs.

Thus there has been provided, in accordance with the present invention an improved solid state, semiconductor type, power relay having particular utility in a proportional speed floating control system, and which is characterized by its capacity reliably to supply, in response to a d-c time proportioned signal in a two-wire low voltage and current transmission line, alternating current energizing power from single-phase or three-phase alternating current supply systems to a valve actuator for operation of the latter in a direction and at a speed varying in accordance with the direction and extent of deviation of a process variable under control from a desired set point.

Subject matter disclosed but not claimed in this application is disclosed and claimed in the copending application bearing Ser. No. 469,339 filed on even date herewith, of Justin O. Johnson and Eugene Guicheteau.

The embodiments of the invention in which an exclusive property right is claimed are defined, as follows:

1. In a process control system having means to produce a signal that is variable in accordance with changes in a process and provided with a final control means arranged to be operated by a coupled reversible electrical motor for adjustment of said final control means, and thereby said process, in a direction to bring said process-variable signal into accord with a set point signal, the rate of said adjustment being dependent upon the extent of deviation of said process-variable and set point signals, a circuit comprising:

an electronic controller for comparing said process-variable and set point signals to produce a time-proportioned direct current signal of a first polarity characteristic when said process variable signal is less than said set point signal and of a second or opposite polarity characteristic when said process-variable signal is greater than said set point signal, the proportion of time on to time off of said signal being variable in accordance with the extent of deviation of said process-variable and set point signals, a power relay connected to and controlled by said electronic controller, said power relay including a pair of semi-conductor switch means each of which normally is in an off state, the first of which switch means is adapted to be fired to an on state when said time-proportioned signal is of said one polarity characteristic and the second of which switch means is adapted to be fired to an on state when said time-proportioned signal is of said second polarity characteristic, the proportion of time on state to time off state of said switch means being determined by the time-proportioning of said signal, means connecting said semi-conductor switch means and said reversible motor to a source of alternating current for energization of said motor for rotation in one direction when one of said semi-conductor switch means is fired and for energization of said motor for rotation in the opposite direction when the other of said semi-conductor switch means is fired, the speed of said motor being determined by the proportion of time on to time off of the state of said semi-conductor switch means, and first and second normally disabled firing circuit means controlled by said time-proportioned signal, each of said firing circuit means being operable when enabled to provide a triggering signal to an associated one of said semi-conductor switch means.

2. A process control system as set forth in claim 1 including means to detect zero voltage across the principal electrodes of each of said semi-conductor switch means, and enabling means connected to said zero voltage detecting means and operative in response to zero voltage across the semi-conductor switch means that is to be fired to momentarily enable the associated firing circuit means.

3. A process control system as set forth in claim 1 including further means responsive to the voltage across the principal electrodes of each of said semi-conductor switch means and operative to so inhibit the operation of said firing circuit means that firing of one or the other of said semi-conductor switch means is permitted only when the voltage across the principal electrodes of the other one of said semi-conductor switch means is above a predetermined value.

4. A process control system as set forth in claim 1 including means to delay for a predetermined time the actuation of said firing circuit means for said first or second normally disabled firing circuit means immediately after the other of said firing circuit means has been enabled.

5. A process control system as set forth in claim 1 including means to delay for a predetermined time the actuation of said firing circuit means upon a rapid change in the characteristic of said time-proportioned signal whereby to preclude reversal in the direction of energization of said motor for rotation at a rate faster than said predetermined time.

6. A process control system as set forth in claim 1 wherein said power relay is positioned adjacent said reversible electrical motor at a location remote from said electronic controller and wherein the control connection between said electronic controller and power relay comprises a two-wire transmission line that is the sole conducting path for said d-c current.

7. In a process control system as set forth in claim 1 including means to monitor the state of said semi-conductor switch means and the operation of said firing circuit means and to provide a signal when the state of said semi-conductor switch means does not correspond to the operation of said firing circuit means.

8. In a control apparatus for selectively controlling in response to a condition an applied alternating current flow to a first or a second load, each of which has a variable power factor, through power handling semi-conductor switch means, a circuit comprising first and second power handling semi-conductor switch means adapted to connect said first and second loads, respectively, to a source of alternating current, normally disabled firing circuit means individually associated with each of said semi-conductor switch means to provide a triggering signal to the semi-conductor switch means associated therewith, means responsive to zero voltage across the principal electrodes of each of said semi-conductor swich means, condition responsive means to selectively provide a control signal to one or the other of said firing circuit means, means responsive to said zero voltage responsive means to enable at zero voltage across the semi-conductor switch means, that one of said firing circuit means to which a control signal is provided by said condition responsive means, and means to delay for a predetermined time the firing of the other one of said firing circuit means for a predetermined time after said one of said firing circuit means has been enabled and the associated semi-conductor switch means has been fired.

9. In a control apparatus for selectively controlling in response to a condition an applied alternating current flow to a first or a second load, each of which has a variable power factor, through power handling semi-conductor switch means, a circuit comprising first and second power handling semi-conductor switch means adapted to connect said first and second loads, respectively, to a source of alternating current, a normally disabled firing circuit means individually associated with each of said semi-conductor switch means to provide a triggering signal to the semi-conductor switch means associated therewith, means responsive to zero voltage across the principal electrodes of each of said semi-conductor switch means, condition responsive means to selectively provide a control signal to one or the other of said firing circuit means, means responsive to said zero voltage responsive means to enable at zero voltage across the semi-conductor switch means, that one of said firing circuit means to which a control signal is provided by said condition responsive means, means to detect the voltage across the principal electrodes of each said semi-conductor switch means, and means connecting said detection means to said firing circuit means to allow enabling thereof only when the voltage across the semi-conductor switch means that is not to be fired is above a predetermined level.

10. In a control apparatus for controlling, in response to a condition an applied alternating current flow through power handling semi-conductor switch means, a circuit comprising, first and second pairs of power handling semi-conductor switch means, first and second condition responsive means each operative to produce first and second gating signals that are operative to fire an associated one of said pairs of semi-conductor switch means, a plurality of pairs of power source terminals, a single load device, one pair of said semi-conductor switch means being connected to supply power to said load device from the terminals of at least two such power sources and the other pair of said semi-conductor means being connected to supply power to said load device from the terminals of said power sources, the first and second gating signals of a first one of said condition responsive means being applied to a respective gate circuit of said one pair of said semi-conductor switch means, and the first and second gating signals of the other condition responsive means being applied to the gate circuit of the other pair of said second pair of semi-conductor switch means.

11. A control circuit as specified in claim 10 wherein said load device comprises a three-phase reversible electrical motor and said plurality of pairs of power source terminals provide a three-phase source of alternating current power, and including means to inhibit the gating signal from each of said condition responsive means to its related pair of semi-conductor switch means whereby to permit a gating signal to be applied to a semi-conductor switch of each pair only when the voltage across the other semi-conductor switch of said pair is above a predetermined level.

12. A control circuit as specified in claim 10 wherein other means are associated with each of said condition responsive means to delay momentarily the gating signals produced thereby upon a reversal in the condition sensed by said condition responsive means whereby to preclude rapid alternation in the firing of the said pairs of semi-conductor switch means.

13. In a control apparatus for selectively controlling in response to a condition an applied alternating current flow to a first or a second load, each of which has a variable power factor, through power handling semi-conductor switch means, a circuit comprising first and second power handling semi-conductor switch means adapted to connect said first and second loads, respectively, to a source of alternating current, a normally disabled firing circuit means individually associated with each of said semi-conductor switch means to provide a triggering to the semi-conductor switch means associated therewith, means responsive to zero voltage across the principal electrodes of each of said semi-conductor switch means, condition responsive means to selectively provide a control signal to one or the other of said firing circuit means, means responsive to said zero voltage responsive means to enable at zero voltage across the semi-conductor switch means, that one of said firing circuit means to which a control signal is provided by said condition responsive means, and means to delay for a predetermined time the enabling of said firing circuit means by said condition responsive means upon rapid shift in control signal from one of said firing circuit means to the other.

* * * * *